United States Patent
VanNess

(10) Patent No.: US 12,387,269 B1
(45) Date of Patent: *Aug. 12, 2025

(54) INTELLIGENT ASSET EVALUATION SYSTEMS USING MULTI-MODAL DATA ANALYSIS WITH NEURAL NETWORK ARCHITECTURES AND PERSONALIZATION

(71) Applicant: Recursive Capital, Inc., Roseville, CA (US)

(72) Inventor: Sidney VanNess, Granite Bay, CA (US)

(73) Assignee: Recursive Capital, Inc., Roseville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/172,491

(22) Filed: Apr. 7, 2025

Related U.S. Application Data

(63) Continuation of application No. 18/969,267, filed on Dec. 5, 2024, now Pat. No. 12,293,414.

(51) Int. Cl.
*G06Q 40/06* (2012.01)

(52) U.S. Cl.
CPC .................... *G06Q 40/06* (2013.01)

(58) Field of Classification Search
CPC ....................................... G06Q 40/06
USPC ....................................... 705/35–45
See application file for complete search history.

(56) References Cited

U.S. PATENT DOCUMENTS

| | | | | |
|---|---|---|---|---|
| 7,840,604 B2 * | 11/2010 | Zhu | ........ | G06Q 40/00 707/802 |
| 2007/0150298 A1 * | 6/2007 | Barney | ........ | G06Q 50/184 705/306 |
| 2009/0259506 A1 * | 10/2009 | Barney | ........ | G06Q 10/10 705/35 |
| 2016/0098703 A1 * | 4/2016 | Belchee | ........ | G06V 30/224 705/39 |
| 2021/0350459 A1 * | 11/2021 | Goodman | ........ | G06F 18/214 |
| 2024/0311404 A1 * | 9/2024 | Hurwitz | ........ | G06F 16/3329 |
| 2025/0022068 A1 * | 1/2025 | Stecker | ........ | G06Q 30/0278 |
| 2025/0029182 A1 * | 1/2025 | Howard | ........ | G06Q 50/01 |
| 2025/0131500 A1 * | 4/2025 | Degenhardt | ........ | G06F 3/04845 |

* cited by examiner

*Primary Examiner* — Robert R Niquette

(57) ABSTRACT

This disclosure relates to an asset evaluation system that collects multi-modal asset data, extracts asset features using a neural network architecture, and generates personalized value scores based on user profiles. The system analyzes image and textual content to extract asset features, correlates those features with personalization data in user profiles, and generates tailored asset analysis results. The system can predict a value score for each user profile-asset pair in a manner that goes beyond mere consideration of asset pricing, and which accounts for specific personalization parameters stored in each user profile, such as parameters corresponding to the user's technical capabilities and certifications, risk tolerance, investment preferences, timeline requirements, available resources, and potential synergies with existing assets. Additionally, in certain embodiments, the asset evaluation system may employ a distributed architecture that utilizes multiple interconnected processing nodes to efficiently handle large-scale data processing.

20 Claims, 8 Drawing Sheets

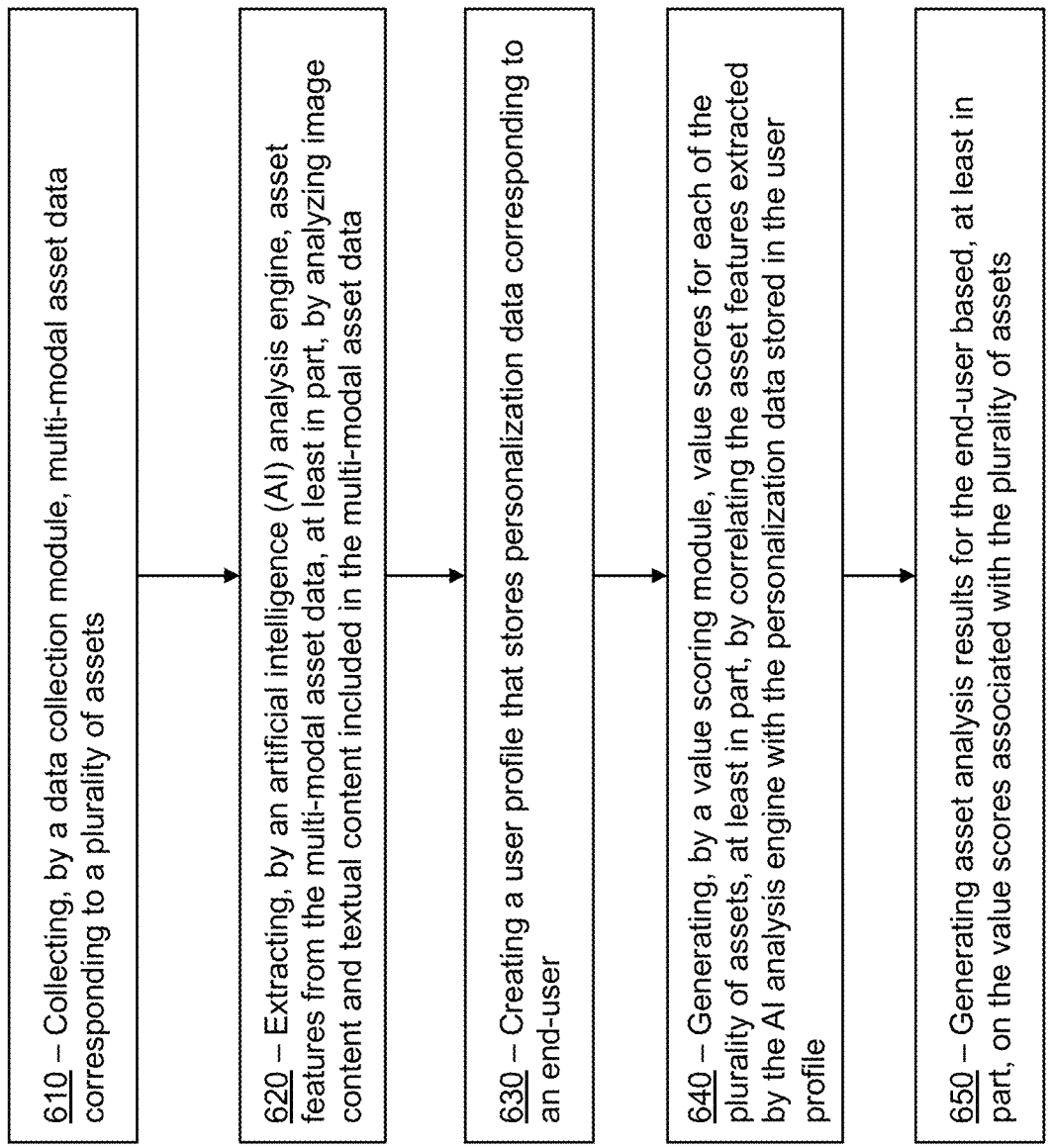

INTELLIGENT ASSET EVALUATION SYSTEMS USING MULTI-MODAL DATA ANALYSIS WITH NEURAL NETWORK ARCHITECTURES AND PERSONALIZATION

CROSS-REFERENCE TO RELATED APPLICATIONS

This application is a continuation of U.S. patent application Ser. No. 18/969,267 filed on Dec. 5, 2024. The content of the above-identified application is incorporated herein by reference in its entirety.

TECHNICAL FIELD

This disclosure is related to artificial intelligence (AI) systems for discovering, evaluating, prioritizing, and/or identifying high-value assets including, but not limited to, real estate, vehicles, aircraft, boats, businesses, and industrial machinery. In certain embodiments, an AI analysis engine can be configured to optimize asset discovery, selection, and/or identification by conducting a true value-oriented analysis that extends beyond price considerations, such as by utilizing multi-modal asset data to execute personalized asset evaluations that align individual user capabilities, preferences, and/or objectives with detected asset features. In certain embodiments, the system is able to personalize asset evaluations by predicting value scores specific to each user profile, whereby the value scores account for specific personalization parameters, such as parameters corresponding to the user's technical capabilities and certifications, risk tolerance, investment preferences, timeline requirements, available resources, and/or potential synergies with existing assets.

BACKGROUND

Traditional asset search and valuation systems, such as Zillow Zestimate® for real estate and Kelley Blue Book® for vehicles, are constrained by several significant limitations due to their reliance on narrow, price-centric criteria and lack of personalization.

One key limitation of traditional systems can be attributed to their emphasis on price, rather that the "true value" of assets. For example, systems like Zillow Zestimate® and Kelley Blue Book® provide superficial assessments that focus primarily on price estimations based on basic features and historical sales data. However, these systems often overlook assets that offer greater overall value in terms of quality, unique features, potential for appreciation, or situational benefits specific to the buyer. Missed opportunities may occur when traditional systems frequently filter out high-value assets priced higher due to exceptional characteristics. This filtering process can prevent users from discovering superior options that align with their long-term goals or unique capabilities.

Another limitation of traditional systems can be attributed to their lack of data integration and reliance on single-modal data. For example, most traditional systems rely on limited data types, such as numerical property characteristics or basic vehicle specifications, without integrating multi-modal data such as high-resolution images, maintenance records, or environmental context. These systems further lack advanced AI-based searching or valuation techniques. Rather, these systems typically rely on basic statistical models to assess asset value and do not employ advanced artificial intelligence (AI) methods, such as specialized neural networks or natural language processing models, to analyze complex data sets. The reliance on single-modal data and antiquated valuation models often results in asset recommendations that are sub-optimal and/or less relevant to users.

A further drawback of traditional systems can be attributed to limitations on scalability and/or real-time processing. For example, traditional asset search and valuation systems lack sophisticated processing architectures necessary to process large-scale data sets in real-time, limiting their ability to provide up-to-date valuations and recommendations.

Another limitation of traditional systems can be attributed to their inability to assess value objectively and/or to standardize evaluations. Existing systems fail to adjust valuations based on individual buyer profiles, technical capabilities, and/or preferences. For example, they fail to consider how a buyer's expertise in renovations or mechanical skills could affect the true value of an asset to that buyer. Additionally, many traditional systems, such as automated valuation models (AVMs) and online marketplaces, merely provide generic valuations, such as general market valuations that fail to account for situational factors unique to each buyer, which ultimately leads to less relevant recommendations.

A further limitation of traditional systems can be attributed to their failure to conduct an environmental and/or contextual analysis related to the assets. For example, traditional valuation tools often ignore environmental and situational elements that significantly impact an asset's value, such as neighborhood trends, economic indicators, or regional market dynamics. Furthermore, because traditional systems lack any contextual analysis, they fail to analyze how factors like proximity to amenities, community investment levels, or regional usage conditions can affect asset desirability and value over time.

A further limitation of traditional systems can be attributed to inadequate user profiling and personalization techniques that are implemented on the systems. For example, most systems employ a "one-size-fits-all" approach with respect to creating profiles for users and/or personalizing asset recommendations for users. They fail to create comprehensive user profiles and/or adjust asset recommendations based on individual capabilities, risk tolerance, or investment preferences. They also do not account for synergies with other user assets. For example, there is no consideration with respect to how assets on their platforms might complement or enhance the value of assets a buyer already owns, resulting in missed opportunities for portfolio optimization.

Some notable examples of traditional systems that provide asset listing and valuation functions include Zillow Zestimate® for real estate assets, Kelley Blue Book® for vehicle assets, automated valuation models (AVMs) used by financial institutions, and online marketplaces such as AutoTrader® and Realtor.com®. These asset search and valuation systems have made significant strides in providing users with accessible information on asset prices and basic features, and they have simplified the process of obtaining asset valuations to some extent. However, each of these systems are limited by the aforementioned drawbacks, which ultimately affect their usefulness in providing comprehensive and personalized asset assessments to end-users.

In one example, Zillow's Zestimate® is an online system that offers estimated market values for residential real estate properties using proprietary algorithms. It considers publicly available data, such as property characteristics and historical sales transactions, to generate price estimates. However, the algorithm utilized by Zestimate® focuses primarily on general market trends and basic property attributes, often failing to account for unique property features, environmental factors, or situational benefits that could significantly impact a property's true value. The Zestimate® system also is limited by its lack of personalization capabilities, as it does not adjust valuations based on individual buyer preferences, capabilities, or intended usage of the property. Moreover, the system is constrained by its reliance on limited data types, as its valuation process does not incorporate multi-modal data, such as high-resolution images, detailed property descriptions, or environmental context, that could provide deeper insights into a property's true value.

In another example, Kelley Blue Book® (KBB) is a widely recognized service providing vehicle valuations based on factors like make, model, year, mileage, and general condition. However, KBB's valuation approach is limited by many of the same drawbacks mentioned above. For example, KBB offers general market valuations in a vacuum, without considering individual vehicle history, maintenance records, or unique features that could affect the vehicle's value. Like the Zestimate® system, the KBB valuation process does not account for buyer-specific factors (e.g., such as technical expertise or mechanical skills that might influence the perceived value of a vehicle requiring repairs) and its valuation process also relies on limited data sources which do not consider features across diverse data types, like high-resolution images, detailed service records, or environmental factors affecting vehicle condition. The system also does not consider how environment factors (e.g., local climate, road conditions, or regional usage patterns) could impact a vehicle's long-term value, nor does it account for potential synergies between vehicles, such as how a particular vehicle might complement others in a buyer's existing fleet or collection.

In a further example, AVMs are statistical models used primarily by financial institutions to estimate real estate values. Typically, AVMs analyze property data and comparable sales to generate valuations. However, AVMs are limited by many of the drawbacks mentioned above. For example, AVMs only provide generic valuations without adjusting for individual buyer circumstances, capabilities, or preferences, which may result in valuations that do not reflect the true value of properties to specific buyers. Additionally, AVMs may rely on outdated or incomplete data sets, which may lead to less accurate valuations that do not reflect current market conditions. Furthermore, AVMs may not consider environmental or situational factors that could impact property value, such as neighborhood development trends, regional economic indicators, or other contextual elements that may affect a property's desirability and long-term value potential.

In a further example, online marketplaces, such as Auto-Trader®, Realtor.com®, and Boat Trader® permit users to search for assets based on basic criteria like price, location, and specifications. Again, these online marketplaces are limited by many of the drawbacks mentioned above. For example, these marketplaces only provide basic filtering capabilities without advanced analytical tools or personalized recommendations beyond simple search filters. Additionally, these marketplaces lack integration of advanced AI techniques that analyze multi-modal data or provide deeper insights into asset value. Furthermore, these marketplaces do not adjust asset listings or valuations based on individual user profiles, capabilities, or preferences, which often results in less relevant recommendations that do not align with specific user needs. For instance, a user with mechanical expertise may find value in assets requiring repairs, while another user may require turnkey assets. Yet, these marketplaces may not account for such distinctions when presenting search results or valuations.

In sum, traditional asset listing or valuation systems share the following common limitations:

Price-Centric Focus: Emphasis on price estimations without a comprehensive assessment of true asset value, which includes intrinsic qualities, situational factors, and potential synergies with the buyer's existing assets.

Lack of Personalization: Absence of buyer profiling and customization of valuations based on individual capabilities, preferences, and objectives.

Limited Data Integration: Reliance on limited data types, failing to incorporate multi-modal data such as high-resolution images, maintenance records, environmental context, and advanced textual descriptions.

No Advanced AI Utilization: Lack of specialized AI algorithms, such as neural networks that perform feature detection on visual data and/or natural language processing systems for extracting implicit features from textual data.

Static and Outdated Valuations: Failure to provide real-time, dynamic valuations that reflect current market conditions and newly available data.

Inadequate Environmental and Contextual Analysis: Neglect of environmental factors and situational elements that significantly impact asset value over time.

Scalability Limitations: Inability to process large-scale data sets in real-time or to handle simultaneous analysis across multiple markets and asset types.

This background section is intended to provide context for the inventive aspects described in this disclosure. The information presented herein should not be interpreted as an admission of prior art, nor should any portion of this background section be construed as prior art.

BRIEF DESCRIPTION OF DRAWINGS

To facilitate further description of the embodiments, the following drawings are provided, in which like references are intended to refer to like or corresponding parts, and in which:

FIG. 6 is a flowchart illustrating an exemplary method in accordance with certain embodiments.

The terms "first," "second," "third," "fourth," and the like in the description and in the claims, if any, are used for distinguishing between similar elements and not necessarily for describing a particular sequential or chronological order.

Figure 1A:
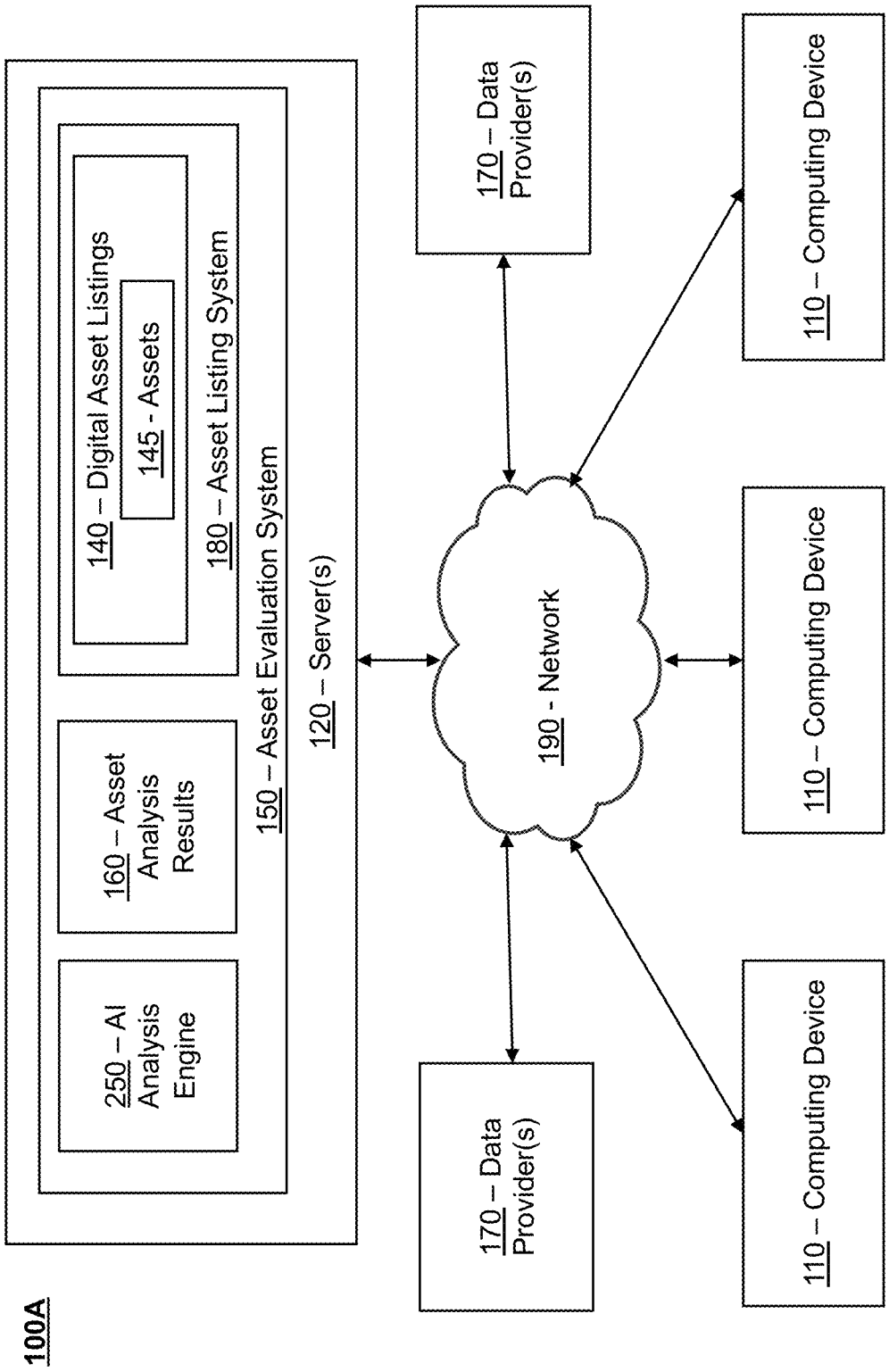
FIG. 1A is a network diagram of an exemplary system in accordance with certain embodiments.

It is to be understood that the terms so used are interchangeable under appropriate circumstances such that the embodiments described herein are, for example, capable of operation in sequences other than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION

The aforementioned limitations highlight a critical gap in the field of asset discovery, identification, and evaluation.

The present disclosure is directed to systems, methods, apparatuses, computer program products, and techniques for implementing AI-driven asset analyses and evaluations which overcome the aforementioned limitations and/or other limitations of traditional systems that facilitate listing, searching, and/or valuing assets.

In certain embodiments, an asset evaluation system is disclosed which comprises an AI analysis engine that integrates multi-modal asset data to evaluate assets and/or more accurately determine asset value. The asset evaluation system can be configured to assess or predict true asset values across multiple dimensions, rather than focusing solely on pricing and/or basic listing attributes. The AI analysis engine can include, or communicate with, specially configured neural networks, including those which employ computer vision (CV) and natural language processing (NLP) technologies, that are designed to analyze various types of data corresponding to assets (e.g., including, but not limited to, images, videos, text, and/or audio data). By analyzing multi-modal data corresponding to the assets, the AI analysis engine is able to gain a deeper understanding of the asset features and more accurately predict value scores that quantify or reflect the true value of the assets.

The asset evaluation system also may include, or communicate with, a personalization engine that collects and/or stores profiles corresponding to the end-users. In contrast to traditional systems, the profiles generated for end-users can include data that is more comprehensive and highly personalized to each specific user. In some examples, the profiles may store parameters indicating capabilities of the end-users (e.g., their technical capabilities, mechanical capabilities, etc.), complimentary assets already owned by the end-users, reasons for acquiring or investing in specific assets, risk tolerances, and/or other personalized information that can be useful in assessing the value of assets that are being analyzed by the asset evaluation system. As explained below, these highly personalized end-user profiles can be utilized in combination with the multi-modal asset features extracted by the AI analysis engine to more accurately predict the value of assets to specific end-users and/or to enable the end-users to more easily discover assets that align with their profiles.

In certain embodiments, the asset evaluation system can be implemented using improved architectures and processing techniques, which can facilitate the processing of large-scale datasets and computationally intensive analyses to provide real-time or near real-time insights to end-users. In some examples, the asset evaluation system can incorporate a distributed processing architecture that allocates workloads for collecting and/or analyzing the multi-modal asset data among a plurality of nodes to facilitate rapid response times. This distributed computing architecture also facilitates scalability of the system, allowing for simultaneous analysis of large-scale asset data across distinct asset types or markets.

In some examples described in this disclosure, the techniques for discovering, identifying, analyzing, and/or valuing assets are described with reference to particular types of assets, such as assets corresponding to real estate, vehicles, aircraft, and/or industrial equipment. However, the techniques described herein may be applied to any type of asset including, but not limited to, commercial properties, residential properties, industrial equipment, manufacturing facilities, agricultural equipment, construction equipment, marine vessels, artwork, collectibles, intellectual property, business assets, inventory, precious metals, commodities, financial instruments, and/or other types of tangible or intangible assets.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
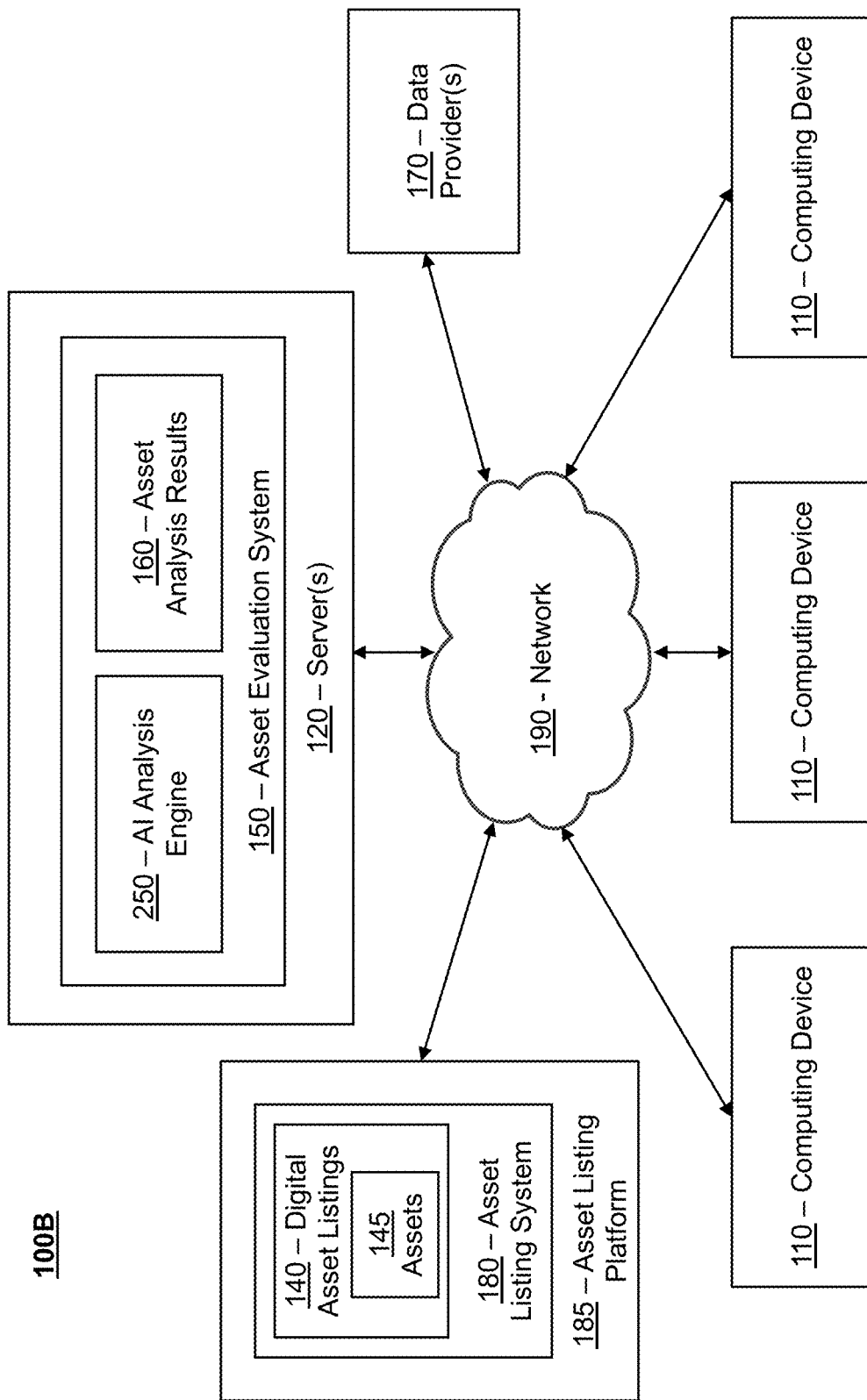
FIG. 1B is another network diagram of an exemplary system in accordance with certain embodiments.

FIG. 1A is a diagram of an exemplary system 100A in which an asset evaluation system 150 is included in a network environment in accordance with certain embodiments. FIG. 1B is a diagram of an exemplary system 100B in which an asset evaluation system 150 is included in a network environment in accordance with certain embodiments.

The asset evaluation system 150 can be configured to analyze, identify, discover, and/or evaluate assets 145, including tangible assets (e.g., real estate, vehicles, boats, equipment, items, physical artworks, etc.) and/or intangible assets (e.g., digital art, financial products, securities, etc.), utilizing enhanced techniques that more accurately and precisely determine actual or true values of the assets 145. End-users can access the asset evaluation system 150 to search for assets 145 and/or receive alerts, notifications, or recommendations related to the assets 145.

In some embodiments, an asset listing system 180 stores a collection of digital asset listings 140, each of which corresponds to an asset 145 or grouping of assets 145. Each digital asset listing 140 may comprise multiple data types (e.g., text, images, videos, audio recordings, etc.) describing a corresponding asset 145. By extracting asset features from the multi-modal data included in the digital asset listing 140 and/or data obtained from other data providers 170 (e.g., external or third-party databases), the asset evaluation system 150 can determine or predict the true value of a given asset 145 for each of a plurality of end-users by correlating the extracted asset features with user profiles stored for the end-users. In some examples described below, the asset evaluation system 150 can compute a value score for each user profile-asset pair in a manner that considers a variety of highly personalized parameters, such as those indicating the user's technical capabilities and certifications, risk tolerance, investment preferences, timeline requirements, available resources, and potential synergies with existing assets. In doing so, the predicted value of a given asset 145 can vary across end-users based on personalization parameters associated with each of the end-users, which can serve to adjust the value upward or downward for each end-user. The asset evaluation system 150 can transmit or present asset analysis results 160 to the end-users in various ways (e.g., via alerts, notifications, recommendations, ranked listings of search results, etc.).

The exemplary system 100A illustrated in FIG. 1A demonstrates an embodiment in which an asset listing system 180 is integrated with the asset evaluation system 150 and/or stored on the same server system of the asset evaluation system 150. This exemplary configuration can be implemented in scenarios where a single service provider maintains both the asset evaluation system 150 and the asset listing system 180. This exemplary configuration also can be implemented in scenarios where the enhanced asset evaluation techniques described in this disclosure are integrated with a traditional asset listing provider (e.g., such as Zillow®, Kelley Blue Book®, Autotrader®, etc.). In this configuration, the asset evaluation system 150 may communicate directly with the asset listing system 180 to access the digital asset listings 140 offered through the asset listing system 180.

The exemplary system 100B illustrated in FIG. 1B demonstrates another exemplary embodiment in which an asset listing system 180 is hosted on a third-party asset listing platform 185 that is separate from the server system that hosts the asset evaluation system 150. This exemplary configuration can be implemented in scenarios where the asset evaluation system 150 and the asset listing system 180 are maintained by separate service providers. In this configuration, the asset evaluation system 150 may act as a service provider to traditional asset listing providers, retrofitting those traditional systems with enhanced features for discovering high value assets 145 and/or correlating assets 145 with end-users in a highly personalized fashion.

The asset evaluation techniques described throughout this disclosure equally apply to both of the configurations illustrated in FIGS. 1A and 1B.

In further detail, the systems (100A, 100B) comprise one or more computing devices 110, one or more servers 120, and/or one or more data providers 170 that are in communication over a network 190. In some cases, the systems also may include one or more asset listing platforms 185 that are in communication with the one or more computing devices 110 and/or the one or more servers 120 over the network 190. The asset evaluation system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, a satellite network, and/or other types of networks.

All the components illustrated in FIGS. 1A and 1B, including the computing devices 110, servers 120, asset evaluation system 150, data providers 170, asset listing systems 180, and asset listing platforms 185 can be configured to communicate directly with each other and/or over the network 190 via wired or wireless communication links, or a combination of the two. Each of the computing devices 110, servers 120, asset evaluation system 150, data providers 170, asset listing systems 180, and asset listing platforms 185 can include one or more computer storage devices 101, and one or more processing devices 102, and/or one or more communication devices 103.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPUs), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices 101 including, but not limited to, instructions associated with performing the asset analyses described herein.

The one or more storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices 101 may be physical, non-transitory mediums. The one or more storage devices 101 can store instructions associated with any of the functionalities mentioned in this disclosure, including those associated with performing the asset analyses described herein.

Each of the one or more communication devices 103 can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices 103 can include one or more transceiver devices, each of which includes a transmitter and a receiver for communicating wirelessly. The one or more communication devices 103 also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices 103 additionally, or alternatively, can include one or more modem devices, one or more router devices, one or more access points, and/or one or more mobile hot spots. For example, modem devices may enable the computing devices 110, servers 120, asset evaluation system 150, asset listing systems 180, and asset listing platforms 185 to be connected to the Internet and/or other networks. The modem devices can permit bi-directional communication between the Internet (and/or other network) and the computing devices 110, servers 120, asset evaluation system 150, data providers 170, asset listing systems 180, and asset listing platforms 185. In certain embodiments, one or more router devices and/or access points may enable the computing devices 110, servers 120, asset evaluation system 150, data providers 170, asset listing systems 180, and asset listing platforms 185 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, asset evaluation system 150, asset listing systems 180, and asset listing platforms 185 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the computing devices 110 mentioned above. The one or more servers 120 also can comprise one or more mainframe computing devices, one or more virtual servers, and/or one or more cloud servers. In some embodiments, the one or more servers 120 can be configured to execute web servers for communicating with the computing devices 110, data providers 170, asset listing systems 180, asset listing platforms 185, and/or other devices over the network 190 (e.g., over the Internet). In certain embodiments, the asset listing platforms 185 also be hosted on or include one or more servers 120 and/or one or more computing devices 110.

In certain embodiments, the asset evaluation system 150 can be stored on, and executed by, the one or more servers 120. For example, the asset evaluation system 150 may be implemented using one or more web applications and/or one more server side applications. Additionally, or alternatively, the asset evaluation system 150 can be stored on, and executed by, the one or more computing devices 110. For example, the asset evaluation system 150 also can be stored as a local application on a computing device 110, or integrated with a local application stored on a computing device 110, to implement the techniques and functions described herein. The asset evaluation system 150 can be executed be stored on, and executed, by other devices as well.

Additionally, in some embodiments, the asset evaluation system 150 can be implemented as a combination of a front-end application (e.g., which is stored on a computing device 110) and a back-end application (e.g., which is stored on one or more servers 120). All functionalities of the asset evaluation system 150 described herein can be executed by the front-end application, back-end application, or a combination of both.

In certain embodiments, the asset evaluation system 150 can be integrated with (or can communicate with) various applications including, but not limited to, real estate listing or valuation applications, vehicle listing or valuation applications, product listing or valuation applications, financial services applications, product listing or valuation applications, and/or other applications that are stored on one or more computing devices 110 and/or one or more servers 120. In some examples, the aforementioned applications may be stored on third-party systems, such as asset listing platforms 185, and the asset evaluation system 150 can communicate with these applications to analyze the asset listings 140 stored on the systems and/or to enhance the services and functionalities offered by the third-party systems with respect to analyzing or valuing assets corresponding to digital asset listings 140.

In certain embodiments, the one or more computing devices 110 can enable end-users to access the asset evaluation system 150 and/or the asset listing system 180 over the network 190 (e.g., over the Internet via a web browser application). For example, an end-user can utilize a computing device 110 to communicate with the asset listing system 180 in connection with searching digital asset listings 140 and/or purchasing assets 145. The asset evaluation system 150 can utilize various techniques described in this disclosure to present the end-user with digital asset listings 140 that are highly relevant to the end-user and/or which are predicted to be of high value to the end-user.

As explained throughout this disclosure, the asset evaluation system 150 may derive a more complete understanding of an asset 145, or set of assets 145, identified in an asset listing 140 by analyzing multi-modal data corresponding to the asset or set of assets. For example, each digital asset listing 140 can include various types of digital data describing a corresponding asset. The digital asset listing 140 may include textual data describing the asset and/or features of the asset (e.g., describing asset pricing information, locations of the asset, dimensions of the asset, functional features of the asset, etc.). Additionally, or alternatively, the digital asset listing 140 may include visual data, such as images, videos, and/or animations, corresponding to asset (e.g., depicting the asset, depicting an environment where the asset is located, providing instructional videos, demonstrating usage of the asset, etc.). Additionally, or alternatively, the digital asset listing 140 may include audio data (e.g., an audio recording describing the asset or its usage, or audio data comprising customer reviews). In some scenarios, the audio data may be stored in audio files and/or may be embedded into videos or visual data. The asset evaluation system 150 can utilize specially designed neural network architectures to analyze each of the multiple data types to gain a deep understanding of the asset 145.

Additionally, the asset evaluation system 150 also may supplement its knowledge of the assets 145 by accessing and analyzing additional multi-modal data from one or more data providers 170. For example, in evaluating real estate assets, the asset evaluation system 150 may retrieve and analyze data from data providers 170 such as satellite imagery databases, county property records databases, multiple listing services (MLS), zoning and land use databases, school district performance databases, crime statistics databases, environmental hazard databases, flood zone maps, census databases for demographic information, local economic development databases, transportation databases for commute times and public transit access, and historical sales transaction databases. Likewise, for vehicle or aircraft assets, the asset evaluation system 150 may retrieve and analyze data from data providers 170 such as vehicle history report databases, Department of Motor Vehicles (DMV) records, National Highway Traffic Safety Administration (NHTSA) databases for safety ratings and recall information, manufacturer maintenance schedules and technical service bulletins, insurance claim databases, auction house transaction records, Federal Aviation Administration (FAA) aircraft registry and maintenance logs, air traffic control databases for flight history, aviation weather services for historical weather patterns affecting aircraft operations, aircraft parts supplier databases for component pricing and availability, and online forums or owner groups for user-reported issues and satisfaction ratings.

Again, the data obtained from the various data providers 170 may include multi-modal data, such as text, images, videos, and/or audio, and the asset evaluation system 150 can utilized specially designed neural network architectures to analyze the varying data types to gain a deeper understanding of the assets 145.

The asset evaluation system 150 can utilize the deep understanding of the assets to generate asset analysis results 160, and can transmit the asset analysis results 160 to computing devices 110 operated by end-users. The types of asset analysis results 160 generated by the asset evaluation system 150 can vary.

In one example, the asset analysis results 160 transmitted to a given end-user can graphical user interfaces (GUIs) that include one or more assets 145 and/or one or more digital asset listings 140 that were identified by the asset evaluation system 150 as being high value to the end-user. In another example, while an end-user is searching for assets on an asset listing system 180, the asset analysis results 160 transmitted to a given end-user can include a listing of digital asset listings 140 that are ranked or ordered based, at least in part, on their predicted value to the end-user. In another example, the asset analysis results 160 transmitted to a given end-user can include alerts or notifications that are generated by the asset evaluation system 150 in response to the asset evaluation system 150 detecting or discovering highly relevant assets that may be of interest to the end-user. In some cases, these alerts or notifications can be preemptively transmitted by the asset evaluation system 150 to the end-user via one or more communication channels (e.g., mobile phone alerts, emails, text messages, etc.) immediately upon discovery by the asset evaluation system 150, thereby presenting end-users with immediate access to high-value assets 145 in real-time or near real-time.

As explained in various portions of this disclosure, the digital asset listings 140 (or corresponding assets 145) selected, identified, and/or discovered by the asset evaluation system 150 for each end-user can be based on deep analyses performed on the asset data by specially designed AI analysis systems and/or based on user profiles for the end-user, which may include unique personalization parameters pertaining to the end-user, such as data indicating the end-user's technical capabilities, certifications, risk tolerance, investment preferences, available resources, existing assets, and/or other personalization information.

The system configurations illustrated in FIGS. 1A and 1B are provided as examples to demonstrate environments in which embodiments described herein can be deployed. Numerous modifications and variations to the disclosed embodiments are possible, and the techniques described herein can be implemented in many other contexts and environments.

Figure 2A:
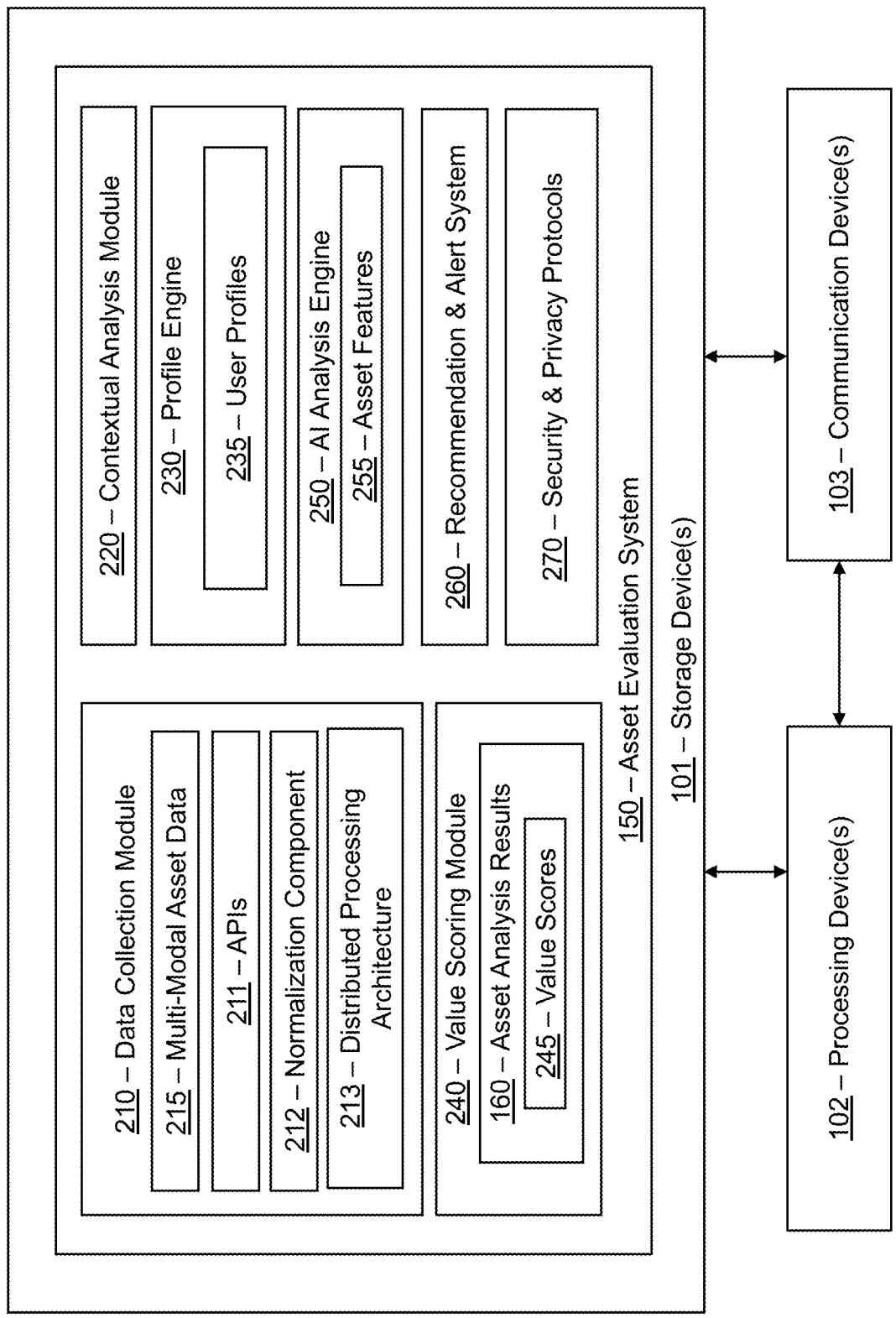
FIG. 2A is a block diagram demonstrating exemplary components of an asset evaluation system in accordance with certain embodiments.

FIG. 2A is a block diagram illustrating exemplary components of an asset evaluation system 150 according to certain embodiments. In this example, the asset evaluation system 150 includes a data collection module 210, a contextual analysis module 220, a profile engine 230, a value scoring module 240, an AI analysis engine 250, a recommendation and alert system 260, and security and privacy protocols 270. While certain portions of this disclosure may describe these components as being separate or distinct, the functionalities associated with these components can be combined in various ways. Thus, any function described for a given component can be integrated with, or performed by, any other component of the asset evaluation system 150.

The data collection module 210 can be configured to collect, aggregate, and/or store multi-modal asset data 215 corresponding to digital asset listings 140. In certain embodiments, the data collection module 210 can be configured to continuously monitor and aggregate the multi-modal asset data 215 from one or more asset listing systems 180 and/or one or more data providers 170, such as government databases, historical record databases, financial institutions, industry-specific data providers, social media platforms, news outlets, satellite imagery services, IoT (Internet-of-Things) devices, public records repositories, and user-generated content platforms. The data collection module 210 may also integrate data from specialized sources like vehicle history reports, aircraft maintenance logs, real estate transaction databases, and environmental monitoring systems. As explained above, multi-modal data 215 collected and analyzed by the data collection module 210 may comprise visual content (e.g., high-resolution images and/or video context), text descriptions, audio descriptions, historical transactions, and/or market trends.

In certain embodiments, the data collection module 210 may incorporate a sophisticated application programming interface (API) framework that integrates seamlessly with various asset listing systems, 180, external data providers 170, and/or other complementary systems. In some examples, the framework may include a plurality of APIs 211 that enable integration with systems such as real estate listing databases, vehicle registration records, aircraft maintenance logs, financial market data providers, weather information services, and geographic information systems to enhance the breadth and depth of data available for asset analysis. These integrations can facilitate real-time awareness of market conditions while ensuring data accuracy and completeness.

The integration capabilities of the data collection module 210 can enable seamless interaction with various external data providers 170 and complementary systems. Rather than operating in isolation, the system can maintain secure connections with multiple asset listing systems 180 and/or multiple data providers 170 through its sophisticated API framework. Unlike traditional systems that rely on periodic updates, the data collection module 210 can be configured to maintain real-time, or near real-time, awareness of market changes, capturing new listings, price adjustments, and status updates as they occur and ensuring comprehensive and up-to-date market coverage.

In certain embodiments, the data collection module 210 also may incorporate a normalization component 212 that automatically normalizes data from the various data sources into consistent formats for analysis, including converting measurements, currencies, and technical specifications. Additionally, when processing international assets, the normalization component 212 can automatically convert measurements, currencies, and technical specifications into standardized formats, enabling accurate cross-market comparisons. The normalization functions can extend to qualitative data, standardizing condition reports and feature descriptions across different reporting formats and languages, facilitating accurate cross-market comparisons.

In certain embodiments, the data collection module 210 also can incorporate a distributed processing architecture 213 that enables simultaneous monitoring and processing of large scale data (including data across multiple market segments), ensuring comprehensive coverage while maintaining efficient processing loads. Thus, the capabilities of the data collection module 210 may extend beyond mere listing data aggregation. When processing a new asset listing, the distributed processing architecture 213 of the data collection module 210 can automatically initiate multiple parallel data gathering operations. Amongst other things, it can capture high-resolution imagery, consolidate historical transaction data, and aggregate relevant market trends. For real estate assets, this can include collecting or gathering property photographs, street-view imagery, and aerial photography. For vehicles or aircraft assets, the data collection module 210 can collect detailed imagery to assess condition, wear patterns, and modifications, alongside maintenance records and operational histories. This multi-modal data 215 can help ensures a complete picture of each asset's current state and historical context.

In certain embodiments, the distributed processing architecture 213 allows for the rapid collection, processing, and analysis of large-scale multi-modal data 215 and permits the delivery of asset analysis results 160 to end-users in real-time or near real-time. The distributed processing architecture 213 can include a plurality of independent processing nodes. The distributed processing architecture 213 can allocate analytic tasks among the nodes for both collecting and processing the multi-modal data 215 corresponding to the assets, thereby allowing these tasks to be processed concurrently or in parallel.

In some examples, the distributed processing architecture 213 may employ task allocation algorithms to efficiently distribute workloads across its network of processing nodes. It may utilize dynamic load balancing techniques to optimize resource utilization, assigning tasks based on each node's current capacity and processing capabilities. In certain embodiments, the architecture may implement a task queue system, where incoming analytic jobs are prioritized and distributed to available nodes in real-time. For complex analyses, the system may break down tasks into smaller, independent subtasks that can be processed concurrently across multiple nodes. The architecture may also employ data locality optimization, assigning tasks to nodes that already have relevant data cached, minimizing data transfer overhead. In cases of node failure or unexpected spikes in workload, the system may implement automatic task redistribution, ensuring uninterrupted processing. The architecture may also support elastic scaling, dynamically adding or removing processing nodes based on current demand, allowing for efficient handling of varying workloads. Additionally, the system may utilize specialized nodes for specific types of analyses, such as dedicating GPU-equipped nodes for image processing tasks or high-memory nodes for large-scale data operations, further optimizing overall system performance.

In one exemplary scenario for processing data relating to a real estate asset, the distributed processing architecture 213 may distribute various analysis tasks across multiple nodes. For example, when analyzing a luxury beachfront property, one node may focus on processing high-resolution exterior images using computer vision algorithms to assess the property's condition, architectural features, and landscaping quality. Simultaneously, another node may analyze interior photos to evaluate room layouts, finishes, and amenities. A separate node may process textual data from the property description, extracting key features and analyzing sentiment. Another node may handle geospatial data, evaluating the property's location, proximity to amenities, and flood risk. Another node may process historical price data and recent comparable sales to establish market trends. Meanwhile, additional nodes may analyze neighborhood data, crime statistics, and school ratings to provide context. The system may also allocate specialized nodes for tasks like processing 3D virtual tours or drone footage of the property. As these tasks are performed concurrently, a coordinating node may aggregate or synthesize the asset features extracted across the nodes, which collectively provide a more complete understanding of the asset under review. These and other parallel processing approaches may enable the system to handle complex, data-intensive evaluations rapidly, even during periods of high demand.

The distributed processing architecture 213 may also facilitate real-time data gathering from multiple sources simultaneously. By allocating data collection tasks across various nodes, the system can efficiently query and process information from diverse data providers 170, such as real estate listing databases, vehicle registries, financial databases, market analytics platforms, and/or other data sources concurrently. This parallel data gathering approach may enable the asset evaluation system to maintain up-to-date, comprehensive datasets across multiple asset classes and markets, ensuring that analyses and valuations are based on the most current information available.

Additionally, the distributed processing architecture 213 may facilitate scalability by allowing the system to dynamically adjust its processing capacity based on demand. It may enable the addition or removal of processing nodes in real-time, allowing the system to handle varying workloads efficiently. As the volume of data or number of asset evaluations increases, the architecture may automatically distribute tasks across additional nodes, maintaining consistent performance. This elastic scaling capability may allow the system to process large numbers of assets simultaneously across multiple markets or asset classes without significant degradation in response times. The architecture may also support horizontal scaling, where additional nodes can be added to the system to increase overall processing power and storage capacity. This scalability may enable the asset evaluation system to grow alongside expanding data sources, user bases, asset classes, and market complexities, ensuring that the system can maintain its performance and accuracy even as demand increases.

In addition to facilitating efficient processing of large-scale data sets, the intelligent load balancing capabilities of the distributed processing architecture 213 can distribute analytical tasks across multiple processing nodes, ensuring rapid response times even during periods of peak demand. Additionally, in certain embodiments, the distributed processing architecture 213 also may include or utilize a multi-tier caching system that maintains frequently accessed data in fast memory, while less frequently needed information is stored in lower-cost storage tiers. This architecture enables the system to simultaneously analyze thousands of assets across multiple markets, identifying value opportunities that might be missed in more limited searches.

The AI analysis engine 250 can include specialized neural networks trained for asset-specific feature detection. In certain embodiments, the AI analysis engine 250 processes the multi-modal data 215 collected or received by the data collection module 210 to assess, extract, and/or identify various asset features 255 corresponding to each the assets. In some examples, the asset features 255 extracted by AI analysis engine 250 may include features identifying the asset conditions, valuable features, and/or potential value opportunities. In some examples, the AI analysis engine 250 may analyze property photographs of real estate to detect construction quality indicators or renovation potential and/or may examines vehicle or aircraft images to assess condition, wear patterns, and modifications. Additionally, in certain embodiments, the AI analysis engine 250 may execute NLP functions to better understand or interpret text data relating to the assets and/or to extract various asset features 255 (e.g., price, location, model type, etc.).

The types of asset features 255 detected can vary based on the type of assets that are being analyzed. For example, for real estate assets, the AI analysis engine 250 may analyze property photographs to identify construction quality indicators, detect renovation potential, and assess maintenance patterns. Similarly, when evaluating vehicles or aircraft assets, the visual analysis capabilities of the AI analysis engine 250 may examine detailed imagery to assess paint condition, detect signs of wear or damage, identify custom modifications, and evaluate overall presentation quality. In aircraft analysis, for example, the system can examine cockpit images to verify avionics configurations and assess interior condition, while exterior images might reveal subtle maintenance indicators or cosmetic issues that affect valuation.

Further details of the AI analysis engine 250, and exemplary asset features 255 that may be extracted by the AI analysis engine 250, are described below with respect to FIG. 2B.

The contextual analysis module 220 can be configured to identify and/or evaluate various contextual asset features 255 that can impact asset value and/or an end-user's propensity to find value in particular assets. Amongst other things, the contextual analysis module 220 may assess, extract, and/or identify various asset features 255 based on an analysis of environmental factors, situational factors, surrounding conditions, and market dynamics that impact an asset or the asset's value. In some examples, in evaluating an asset, the contextual analysis module 220 may consider contextual features, such as neighborhood conditions for real estate assets or regional factors affecting vehicle and aircraft assets. Additionally, the contextual analysis module 220 can leverage the AI analysis engine's image analysis capability to detect subtle indicators like signs of neighborhood investment, facility maintenance quality, and community trends, providing a comprehensive understanding of factors influencing asset value over time.

The contextual analysis module 220 can provide the asset evaluation system 150 with a more comprehensive understanding of the environmental and situational factors that impact asset value. It may analyze a wide range of contextual data, including economic indicators, demographic trends, urban development plans, and local market dynamics. For real estate assets, the contextual analysis module 220 may derive asset features 255 based on an evaluation of neighborhood gentrification patterns, upcoming infrastructure projects, and changes in local zoning laws. In the case of vehicles or aircraft, the contextual analysis module 220 may derive asset features 255 based on assessments of regional usage patterns, climate impacts on maintenance requirements, and proximity to specialized service facilities. The contextual analysis module 220 also may derive asset features 255 based on analysis of data on natural disaster risks, crime rates, and environmental quality to provide a holistic view of an asset's context.

Additionally, by leveraging the capabilities of the AI analysis engine 250, the contextual analysis module 220 may identify subtle correlations between various contextual factors and asset performance over time. This may enable the system to predict future value trends based on emerging patterns in the asset's environment. The module also may compare contextual data across different geographic areas, allowing for more accurate cross-market comparisons of similar assets. By providing this depth of contextual understanding, the module can significantly enhance the accuracy of asset valuations and enable end-users to make more informed decisions based on both current conditions and potential future developments in the asset's environment.

The system's contextual awareness extends beyond individual asset evaluation to encompass environmental and situational factors that impact value. For real estate assets, this can include analyzing neighborhood conditions through street-view imagery, assessing nearby property maintenance patterns, and/or evaluating community investment trends. For vehicle markets, the contextual analysis module 220 can analyze or consider regional factors such as climate impact on vehicle condition, proximity to specialized service facilities, and/or local market preferences. For aircraft assets, the contextual analysis module 220 may analyze or incorporates factors such as hangar availability, maintenance facility quality, and/or regional operating conditions.

This environmental assessment leverages AI image analysis to detect subtle indicators that might be missed in traditional evaluations. For example, when analyzing a residential property, the system can identify signs of neighborhood investment, such as recent renovations on nearby homes, professional landscaping patterns, and/or the presence of high-end vehicles—all of which may be indicators of community stability and potential appreciation. Similarly, when evaluating an aircraft's home base, the system can assess hangar condition, ramp quality, and overall facility maintenance through visual analysis of available imagery.

The predictive capabilities of the asset evaluation system 150 may extend beyond simple trend analysis through the implementation of sophisticated pattern recognition algorithms. By analyzing historical transaction data alongside current market conditions, the asset evaluation system 150 can identify early indicators of value appreciation or depreciation. These indicators might include subtle changes in market velocity, shifts in buyer demographics, and/or emerging maintenance trends that could affect future asset values. In real estate asset analysis, the asset evaluation system 150 may be configured to detect a pattern of increasing renovation activity in a particular neighborhood before property values begin to rise. In aircraft markets, the asset evaluation system 150 can be configured to identify maintenance trends that suggest certain models are becoming more cost-effective to operate.

The profile engine 230 can be configured to generate and store user profiles 235 for end-users. In addition to storing basic demographic information (e.g., name, gender, location, annual income, race, age, job, etc.), the user profiles 235 stored for each user may capture other parameters that can impact the user's perception of value with respect to different types of assets. For example, each user profile 235 may store parameters indicating an end-user's technical capabilities, certifications, risk tolerance, investment preferences, available resources, and/or existing assets (which may be useful for identifying new assets having potential synergies with existing assets). Additionally, the user profiles 235 may store parameters indicating whether corresponding users are luxury buyers, renovators, turn-key buyers (e.g., having no interest in renovating or upgrading assets and prefer assets in good condition), investment buyers, etc.

The data and parameters stored in an end-user's user profile 235 can leveraged to provide asset recommendations that align with each user's unique circumstances and/or to rank assets (or corresponding digital asset listings 140) based on their predicted value to the specific end-user. Recognizing that an asset's value varies significantly depending on the end-user's specific situation, capabilities, and objectives, the asset evaluation system 150 can dynamically adjust and personalize value scores or assessments pertaining to the assets based on the user profiles 235.

In this manner, the asset evaluation system 150 has the ability to match assets with ideal buyers based on sophisticated profiling and capability assessment. For instance, a property requiring substantial renovation might represent an excellent value opportunity for a buyer with construction expertise, while holding significantly less value for a buyer seeking a move-in ready home. Similarly, an aircraft with an engine near TBO (Time Between Overhaul) might be appropriately valued for a buyer with A&P mechanic credentials who can perform the overhaul themselves, while representing a significant additional cost for other buyers.

Along these lines, the value scoring module 240 of the asset evaluation system 150 is able to generate or predict value scores 245 for assets in a manner that is personalized to each user. The value score 245 predicted for a given user profile-asset pair is not simply based on the price of the asset. Rather, the value scoring module 240 can adjust the value score 245 based on the specific personalization parameters stored in each user profile 235, such as by considering factors indicating the user's technical capabilities and certifications, risk tolerance, investment preferences, timeline requirements, available resources, and potential synergies with existing assets. This buyer-centric approach recognizes that true asset value is not absolute, but rather relative to each potential buyer's unique situation.

In certain embodiments, the value scoring module 240 can be configured to synthesize all asset features 255 identified by the asset evaluation system 150, including the asset features 255 identified by the AI analysis engine 250 and/or contextual analysis module 220, to generate dynamic, profile-specific value assessments. Unlike traditional systems that might generate a single value estimate, the value scoring module 240 can generate tailored value scores 245 that reflect each asset's true value potential for different buyer types. Additionally, as explained in various portions of this disclosure, these value scores 245 may be continuously updated as new market data becomes available, ensuring that recommendations remain current and relevant.

The "value scores" described herein can take many different forms. In some examples, the value scores may be represented as numerical indicators within a specified range, such as 0 to 1 or 1 to 100, providing a quantitative measure of an asset's value. In other examples, the value scores may include grading labels like "low," "medium," or "high," offering a qualitative assessment of value. The value scores may also be expressed as similarity metrics, derived from comparing personalization features with asset features to determine how well an asset aligns with a user's profile. In other examples, the value scores may combine multiple indicators, such as a numerical score accompanied by a descriptive label. Additionally, the value scores may be presented as percentiles, indicating an asset's relative value compared to other assets in the same category. The value scores can be represented in many other forms as well.

The ability of the asset evaluation system 150 to understand the true values of assets to specific users can leveraged in various ways to enhance the users' experience. In some examples, when is a user is browsing or searching assets on an asset listing system 180, the search results returned to the user can be ranked, at least in part, based on the value scores 245, such as to present greater value assets higher or earlier in the search results. In other examples, this understanding can be leveraged to provide users with highly relevant asset recommendations and/or to transmit alerts or notifications to the users when highly relevant assets have been discovered.

The recommendation and alert system 260 can be configured to deliver tailored insights based on user sophistication and preferences. In certain embodiments, the recommendation and alert system 260 can provides actionable recommendations through adaptive user interfaces, and can include sophisticated alert mechanisms, which prioritizing exceptional opportunities and ensure timely notifications.

In some examples, the alert mechanisms can employ dynamic thresholds that are adjusted based on market conditions and user preferences. When exceptional opportunities are identified (e.g., such as when assets with unusually high value scores for a specific user profile are detected), the recommendation and alert system 260 can immediately generate and transmit notifications through multiple channels (e.g., app notification, text message, email, automated phone call, inbox message, etc.). These alerts can be prioritized based on factors such as the strength of the match, the likely duration of the opportunity, and the user's historical response patterns.

For sophisticated users, such as professional investors or fleet managers, the system can provide detailed technical analyses, comparative market data, and quantitative risk assessments. For users with less technical expertise, the system can present its findings in more accessible formats, emphasizing practical implications and clear recommendations. This adaptive presentation ensures that users of all experience levels can effectively utilize the system's insights.

In certain embodiments, the asset evaluation system 150 may further provide end-users with access to various types of visual displays. In some examples, interactive dashboards can be accessed via the asset evaluation system 150 to permit users to explore different aspects of asset analyses, with visualization complexity adjusting automatically based on user sophistication. Professional users might see detailed technical charts and comparative analyses, while newer users receive more intuitive, simplified visualizations that emphasize key decision factors.

Various security and privacy protocols 270 can be integrated into the design of the asset evaluation system 150. Amongst other things, the security and privacy protocols 270 apply secure encryption techniques to protect data stored in the user profiles 235 and the transaction histories of the end-users, and multi-factor authentication protocols may be employed to ensure secure access to the data. Additionally, in some cases, role-based access controls may be employed to ensure that end-users only see information relevant to their specific needs while maintaining the confidentiality of sensitive data.

In addition to the above features, the asset evaluation system 150 also can be configured to implement or execute comprehensive error detection and risk mitigation processes to ensure the reliability of its value assessments. Unlike traditional systems that may accept listing data at face value, this asset evaluation system 150 can employ sophisticated validation algorithms to identify potential inaccuracies, misrepresentations, or data anomalies that could affect valuation accuracy. When analyzing property listings, the asset evaluation system 150 can automatically flag potential inconsistencies between textual descriptions and visual data. For example, if a listing claims a real estate asset is "completely renovated," but the image analysis performed by the system reveals outdated features or maintenance issues, then the system can adjust its confidence scoring accordingly.

The aforementioned components of the asset evaluation system 150 can work in concert to deliver accurate, personalized asset recommendations and insights for a wide range of high-value assets including, but not limited to, real estate, vehicles, aircraft, industrial equipment, and commercial properties.

The comprehensive approaches to data collection, analysis, and presentation described throughout this disclosure provide a sophisticated yet accessible platform for identifying and evaluating high-value assets across multiple markets. Its ability to consider both objective and situational factors, while adapting to user capabilities and preferences, represents a significant advancement in automated asset evaluation technology.

The asset evaluation system 150 can redefine asset discovery by focusing on comprehensive value assessments tailored to individual user needs and considering various dimensions that go beyond mere pricing. Additionally, by incorporating advanced AI-driven analysis, environmental context, buyer profiling, and/or dynamic value scoring, the asset evaluation system 150 empowers users to make more informed, value-based decisions at a scale and level of sophistication previously unachievable through manual processes or traditional evaluation methods.

Figure 2B:
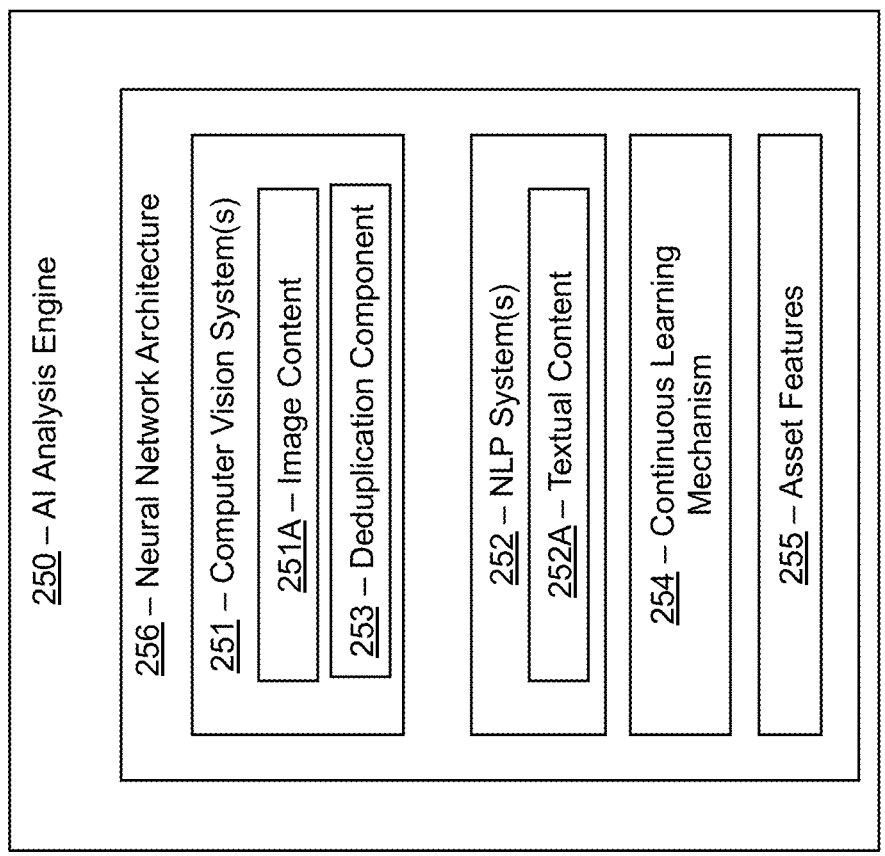
FIG. 2B is a block diagram demonstrating exemplary components of an AI analysis engine in accordance with certain embodiments.

FIG. 2B is a block diagram illustrating an exemplary configuration of the AI analysis engine 250 according to certain embodiments. In this exemplary configuration the AI analysis engine 250 includes a neural network architecture 256 that comprises one or more computer vision systems 251, one or more NLP systems 252, and a continuous learning mechanism 254.

In general, the computer vision system 251 can be trained and configured to detect various asset features 255 included in image content 251A that may be relevant to assessing or evaluating an asset 145 or the value of an asset 145. The particular asset features 255 analyzed or detected by the computer vision system 251 can vary based on the type of assets being analyzed.

The image content 251A provided to the computer vision system 251 for analysis can be obtained from various sources. In some scenarios, the image content 251A may be obtained or extracted from asset listings 140 stored on asset listing systems 180. Additionally, or alternatively, the image content 251A may be obtained from other data providers 170 integrated with the data collection module 210, such as satellite imagery providers, aerial photography services, government databases, social media platforms, professional photography archives, real estate listing services, automotive dealership networks, aircraft broker databases, financial data aggregators, historical image repositories, and user-submitted content platforms.

The image content 251A provided to, and analyzed by, the computer vision system 251 can include any type of image. In certain embodiments, the image content 251A can include one or more two-dimensional (2D) images and/or one or more three-dimensional (3D) images. The image content 251A also can include video content and/or images that are included in video files. The image content 251A may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), STEP (Standard for the Exchange of Product Data), etc. Exemplary color spaces or models can include, but are not limited to, sRGB (standard Red-Green-Blue), Adobe RGB, gray-scale, etc.

The computer vision system 251 can be trained or configured to execute object detection and/or classification tasks for analyzing the image content 251A to detect asset features 255 that are relevant to evaluating or valuing assets. For example, the computer vision system 251 can be configured to detect the presence of objects corresponding to assets, components of assets, conditions of assets, and/or environment factors corresponding to the assets.

In one example, the computer vision system 251 can be trained or configured to execute object detection and/or classification tasks on image content 251A for identifying or extracting asset features 255 for real estate assets. The analysis of the image content 251A may be utilized to detect the presence of structures (e.g., houses, buildings, sheds, etc.) included in the images, as well as the exterior and/or interior conditions of the structures. The analysis of the image content 251A may be utilized to detect the presence of features located on the properties, such as garages, pools, gardens, lawns, playgrounds, athletic facilities (e.g. basketball courts or hoops, tennis courts, etc.). In addition to detecting structures and property features, the computer vision system 251 may be configured to identify and assess landscaping elements such as mature trees, decorative plantings, and water features. The computer vision system 251 may analyze the condition and quality of driveways, walkways, and fencing. It may also detect and evaluate outdoor living spaces like patios, decks, and outdoor kitchens. The computer vision system 251 may be trained to recognize signs of recent renovations or upgrades, such as new roofing, updated windows, or fresh exterior paint. Additionally, the computer vision system 251 may be capable of identifying potential issues or maintenance needs, such as peeling paint, damaged siding, or overgrown vegetation. In some cases, the computer vision system 251 may analyze the surrounding neighborhood, detecting nearby amenities, assessing the condition of neighboring properties, and evaluating street conditions. The computer vision system 251 may also be configured to recognize and assess energy-efficient features like solar panels or smart home technology installations visible from exterior images.

In another example, computer vision system 251 may be configured to analyze image content 251A for identifying or extracting asset features 255 for vehicle assets, executing object detection and classification tasks to evaluate various aspects of the vehicles. The computer vision system 251 may detect and assess the overall condition of the vehicle's exterior, including paint quality, body panel alignment, and signs of damage or rust. It may identify and evaluate key features such as wheel condition, tire tread depth, and the presence of aftermarket modifications. The computer vision system 251 may be trained to recognize different vehicle makes and models, as well as to detect discrepancies between the stated model and the actual vehicle in the images. Interior analyses also may be conducted to assess the condition of seats, dashboard, and other cabin features. The computer vision system 251 may be capable of identifying signs of wear, such as cracked leather or worn carpets, as well as detecting the presence of advanced technology features like infotainment systems or driver assistance cameras. For mechanical components, the computer vision system 251 may analyze engine bay images to assess cleanliness, identify any visible leaks, and detect signs of recent repairs or maintenance. In some cases, the computer vision system 251 may evaluate the vehicle's context, such as the type of environment it's photographed in (e.g., garage, dealership, or outdoor setting), which could provide additional insights into the vehicle's storage conditions and overall care. The computer vision system 251 may also be trained to recognize and assess safety features, both interior and exterior, such as the presence of airbags, seat belts, and advanced driver assistance system (ADAS) sensors.

In another example, the computer vision system 251 may be configured to analyze image content 251A for identifying or extracting asset features 255 for aircraft assets. The computer vision system 251 may detect and assess the overall condition of the airplane's exterior, including paint quality, fuselage integrity, and signs of corrosion or structural damage. The computer vision system 251 also may identify and evaluate key features such as engine nacelles, landing gear condition, wing surfaces, and the presence of any modifications or upgrades. The computer vision system 251 may be trained to recognize different aircraft makes and models, as well as to detect discrepancies between the stated specifications and the actual aircraft in the images. Interior analysis may include assessing the condition of passenger cabins, cockpit instrumentation, and cargo areas. The computer vision system 251 may be capable of identifying signs of wear, such as worn seating, damaged flooring, or outdated avionics, as well as detecting the presence of advanced technology features like modern flight management systems or in-flight entertainment equipment. For mechanical components, the computer vision system 251 may analyze engine compartment images to assess cleanliness, identify any visible fluid leaks, and detect signs of recent maintenance or repairs. In some cases, the computer vision system 251 may evaluate the aircraft's context, such as the type of environment it's photographed in (e.g., hangar, tarmac, or maintenance facility), which could provide additional insights into the airplane's storage conditions and overall care. The computer vision system 251 may also be trained to recognize and assess safety features, both interior and exterior, such as the presence of emergency equipment, life vests, oxygen systems, and advanced avionics for navigation and collision avoidance.

In another example, the computer vision system 251 may be configured to detect asset features 255 by analyzing visual data related to financial instruments and investment portfolios, executing object detection and classification tasks to evaluate various aspects of financial assets and market trends. The computer vision system 251 may process and interpret complex financial charts, graphs, and visualizations to assess market patterns, volatility, and potential investment opportunities. The computer vision system 251 may identify and evaluate key technical indicators, trend lines, and chart patterns that are crucial for financial analysis. The computer vision system 251 may be trained to recognize different types of financial instruments, such as stocks, bonds, derivatives, and cryptocurrencies, as well as to detect anomalies or discrepancies in visual representations of financial data. For portfolio analysis, the computer vision system 251 may assess the composition and diversification of investments through visual representations like pie charts or tree maps. The computer vision system 251 may be capable of identifying signs of market sentiment, such as bullish or bearish patterns in candlestick charts, as well as detecting the presence of advanced financial metrics or risk indicators in visual reports. For regulatory compliance, the computer vision system 251 may analyze visual disclosures and financial statements to identify potential red flags or areas of concern. In some cases, the computer vision system 251 may evaluate the context of financial visualizations, such as the type of platform or software used to generate them, which could provide additional insights into the reliability and sophistication of the financial analysis. The computer vision system 251 may also be trained to recognize and assess visual representations of economic indicators, geopolitical events, and other factors that may impact financial markets and investment decisions.

In certain embodiments, identifying or extracting asset features 255 can include detecting the absence of an element, feature, or structure and/or detecting that an element, feature, or structure is missing from a given asset (e.g., which is expected to be included with that type of asset 145). For example, in the analysis of a real estate asset, the analysis of image or textual content by the computer vision system 251 and/or NLP system 252 may reveal that a property lacks certain types of spaces (e.g., bathrooms, kitchens, etc.), certain types of utilities (e.g., connections for electrical, HVAC, sewage, etc.), and/or certain types of fixtures (e.g., doors, windows, roofs, railings, fences, etc.). Similarly, for vehicle assets, the system may detect the absence of expected safety features, infotainment systems, or certain engine components, while for aircraft assets, it may identify missing avionics equipment, passenger amenities, or specialized instrumentation typically found in comparable models.

The examples provided above demonstrate various types of asset features 255 that may be detected by the computer vision system 251 for different types of assets 145. However, it should be understood that the specific assets mentioned above are provided as examples and the computer vision system 251 can be trained to detect relevant asset features 255 for any category or type of asset.

In certain embodiments, the computer vision system 251 may comprise a convolutional neural network (CNN), or a plurality of convolutional neural networks. Each CNN may represent an artificial neural network, and may be configured to analyze images and to execute deep learning functions and/or machine learning functions on the images. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers can be configured to enable the CNNs to learn and execute various functions for analyzing, interpreting, and understanding the image content 251A, including any of the functions described in this disclosure.

In certain embodiments, one or more training procedures may be executed to train the computer vision system 251 to perform analyze the image content 251A corresponding to the assets. The training procedures can enable the computer vision system 251 to identify assets, asset features 255, conditions of assets, environmental features, and other information. The specific procedures that are utilized to train the neural network architecture 256 can vary. In some cases, one more supervised training procedures, one or more unsupervised training procedures, and/or one or more semi-supervised training procedures may be applied to train the neural network architecture 256, or certain portions of the neural network architecture 256.

In certain embodiments, the computer vision system 251 and/or neural network architecture 256 may include a deduplication component 253 that addresses challenges associated with processing large collections of images. The deduplication component 253 can reduce computational time and resources associated with the processing image content 251A collected for the assets 145 under review. In many scenarios, the image content 251A for each asset 145 can comprise a collection of images, and the deduplication component 253 can be configured to remove duplicate images and/or images that are visually similar to other images included in the collection, thereby reducing the number of images that are processed or analyzed by the computer vision system 251.

For example, digital asset listings 140 often contain multiple images, some of which may be redundant or add minimal additional information beyond what is already captured in other images within the collection. In the case of real estate assets, an image collection may include several nearly identical photographs of the same room taken from slightly different angles, or multiple images depicting the front exterior of a house with only minor variations. Similar redundancies also may be present in image collections corresponding to vehicles, aircraft, and/or other asset types.

The presence of redundant or highly similar images in digital asset listings 140 (or images collected from other sources) can lead to inefficiencies in the image analysis process. Analyzing each redundant image separately may consume unnecessary computational resources and time, potentially impacting the system's ability to provide real-time or near real-time insights. This issue becomes particularly pronounced when processing large-scale datasets that may include thousands or millions of images across numerous asset listings. The deduplication component 253 may be configured to detect and remove such redundant images, thereby optimizing the efficiency of the computer vision analysis and reducing the overall computational burden on the system.

The deduplication component 253 may employ various techniques to identify and remove redundant images from the collection. In some embodiments, the deduplication component 253 may utilize a similarity comparison of image embeddings. For example, a computer vision model, such as CLIP (Contrastive Language-Image Pre-training) or another appropriate model, may convert each of the images into an embedding (e.g., a high-dimensional vector). The embeddings of the images can then be compared using a similarity metric (e.g., such as cosine similarity). If the embeddings of any two images are sufficiently similar (e.g., as compared to some similarity threshold), then one of the images may be removed as redundant, eliminating the need for further processing by the computer vision system.

In certain implementations, the deduplication component 253 may leverage efficient similarity search and clustering techniques to handle redundant image detection and removal. For instance, the computer vision system 251 may include a FAISS (Facebook AI Similarity Search) model and/or other appropriate models, which are optimized for similarity search and clustering of dense vectors. These or other models may be used to create an index of the image embeddings, allowing for rapid similarity comparisons across the entire image collection. This approach may be particularly beneficial when dealing with datasets containing thousands or millions of images, as it can significantly reduce the computational time required for deduplication.

In certain embodiments, the deduplication component 253 may also incorporate pre-processing techniques to enhance efficiency. For example, the system may initially sort images by room or scene type, grouping similar images together before performing detailed similarity comparisons. This pre-sorting step may help reduce the number of unnecessary comparisons between dissimilar images. Additionally, the deduplication component 253 may apply adjustable similarity thresholds, allowing the system to balance between aggressive deduplication for efficiency and conservative retention of potentially unique images. In some cases, the system may retain a representative image from each cluster of similar images, ensuring that key visual information is preserved while still reducing redundancy.

The natural language processing (NLP) system 252 can be trained or configured to execute various NLP tasks for analyzing the textual content 252A and extracting asset features 255 relevant to evaluating or valuing assets 145. In some examples, the NLP system 252 can be configured to detect the key attributes of the assets (e.g., standard attributes included in digital asset listings 140), analyze maintenance, transaction, or purchase records for assets, examine market data, and/or derive inferences based on an analysis of the textual content 252A.

The textual content 252A provided to the NLP system 252 for analysis can be obtained from various sources. In some scenarios, the textual content 252A may be obtained or extracted from asset listings 140 stored on asset listing systems 180. Additionally, or alternatively, the textual content 252A may be obtained from other data providers 170 that are integrated with the data collection module 210, such as property records databases, vehicle history reports, aircraft maintenance logs, financial news feeds, regulatory filings, industry reports, social media platforms, online forums, customer reviews, manufacturer specifications, technical manuals, market analysis reports, economic indicators, legal documents, insurance claim databases, and academic research publications. The system may also access textual data from government agencies, professional associations, trade publications, and specialized industry databases to gather comprehensive information for analysis.

In certain embodiments, in addition to extracting key attributes of the assets and/or implicit features of the assets, the NLP system 252 can identify asset features 255 by performing sentiment analyses on the textual content 252A and/or analyzing historical records and maintenance records corresponding to the assets.

In one example, the NLP system 252 can be trained or configured to execute NLP tasks on textual content 252A for extracting or identifying asset features 255 for real estate assets. The NLP system 252 may analyze property descriptions to extract prominent features, amenities, and unique selling points. The NLP system 252 also may extract asset features 255 which identify and categorize information such as the number of bedrooms and bathrooms, square footage, price, lot size, and architectural style. The NLP system 252 also may be capable of recognizing and interpreting complex real estate terminology, legal jargon in property documents, and location-specific information. The NLP system 252 also may analyze historical property records to track ownership changes, price trends, and renovation history. The NLP system 252 may process neighborhood descriptions to extract information about local amenities, schools, and community features. The NLP system 252 also may analyze textual content from multiple listings to identify patterns in pricing strategies, marketing language, and property positioning. The NLP system 262 may be trained to detect sentiment in property reviews, real estate market reports, and local news articles to gauge market trends and property desirability. Additionally, the NLP system 252 may process and interpret zoning regulations, building codes, and other legal documents to assess development potential or restrictions associated with a property. The NLP system 252 may also analyze textual data from social media and online forums to gather insights on neighborhood reputation and community sentiment.

In another example, the NLP system 252 may be configured to analyze textual content 252A for extracting asset features 255 related to vehicle assets. For example, the NLP system 252 may extract key information from vehicle listings, such as make, model, year, price, mileage, engine specifications, and transmission type. The NLP system 252 also may identify and categorize features like safety equipment, infotainment systems, and driver assistance technologies. The NLP system 252 also may be capable of interpreting complex automotive terminology and technical specifications, including decoding VIN numbers to verify vehicle details. The NLP system 252 may analyze vehicle history reports to track ownership changes, accident history, and service records. The NLP system 252 also may process dealer descriptions to extract information about vehicle condition, modifications, and warranty coverage. The NLP system 252 may also analyze textual content from multiple listings to identify patterns in pricing strategies and marketing language for similar vehicles. The NLP system 252 may be trained to detect sentiment in vehicle reviews, automotive industry reports, and consumer feedback to gauge market trends and vehicle desirability. Additionally, the NLP system 252 may process and interpret technical service bulletins, recall notices, and manufacturer specifications to assess potential issues or maintenance requirements. The NLP system 252 may also analyze textual data from automotive forums and social media to gather insights on vehicle reliability, common problems, and owner satisfaction.

In another example, the NLP system 252 may be configured to analyze textual content 252A for extracting asset features 255 related to financial instruments and investment portfolios. For example, the NLP system 252 may extract key information from financial reports, earnings statements, and regulatory filings to assess company performance and financial health. The NLP system 252 also may identify and categorize data such as revenue figures, profit margins, debt ratios, and growth projections. The NLP system 252 also may be capable of interpreting complex financial terminology, legal language in prospectuses, and industry-specific jargon. The NLP system 252 may analyze historical financial records to track performance trends, dividend histories, and market capitalization changes. The NLP system 252 may process analyst reports and market commentaries to extract insights on investment strategies, sector outlooks, and economic forecasts. The NLP system 252 may also analyze textual content from multiple sources to identify patterns in market sentiment, investment themes, and risk factors. The NLP system 252 may be trained to detect sentiment in financial news articles, earnings call transcripts, and social media posts to gauge market reactions and investor sentiment. Additionally, the NLP system 252 may process and interpret regulatory documents, compliance reports, and corporate governance statements to assess potential risks or opportunities associated with investments. The NLP system 252 may also analyze textual data from financial forums, investor presentations, and company press releases to gather insights on management strategies, competitive positioning, and future growth prospects.

The examples provided above demonstrate various types of asset features 255 that may be detected by the NLP system 252 for different types of assets. However, it should be understood that the exemplary assets mentioned above are provided as examples and the NLP system 252 can be trained to detect relevant asset features 255 for any category or type of asset.

The type and configuration of the NLP system 252 described herein can vary. Various types of NLP systems 252 can be utilized by the asset evaluation system 150. In some embodiments, the NLP system 252 can include a large language model (LLM), such as a generative pre-trained transformer (GPT) model (e.g., a GPT-1, GPT-2, GPT-3, GPT-4, or subsequently developed GPT model). Additionally, or alternatively, the NLP system 252 can include a BERT (Bidirectional Encoder Representations from Transformers) model, an XLNet (Extra-Long Transformer Network) model, a RoBERTa (Robustly Optimized BERT pre-training approach) model, a DeBERTa (Decoding-enhanced BERT with disentangled attention) model, a CTRL (Conditional Transformer Language Model) model, a Claude model (e.g., any version of the Haiku, Sonnet, Opus, and/or other models developed by Anthropic), and/or a T5 (Text-to-Text Transfer Transformer) model. These or other types of machine learning or AI language models can be used to implement the NLP system 252. Additionally, the NLP system 252 can represent a single model in some embodiments and, in other embodiments, the NLP system 252 can be comprised of multiple learning models (including any combination of the aforementioned models).

In certain embodiments, the NLP system 252 can include a transformer neural network architecture that includes a self-attention mechanism, which allows the model to weigh the importance of different parts of a prompt input when generating its output or response. The self-attention mechanism allows the model to selectively focus on different parts of the input when generating its output or response, rather than relying on a fixed context window like other language models. Additionally, the transformer neural network architecture can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures can be utilized to train the NLP system 252. In some cases, one or more supervised or semi-supervised training procedures can be utilized to train the NLP system 252. Additionally, or alternatively, one or more unsupervised training procedures can be utilized to train the NLP system 252.

In some embodiments, the NLP system 252 can be trained via a self-supervised training procedure that includes both an unsupervised training phase and a supervised training phase. The unsupervised training phase can include a pre-training step in which the NLP system 252 is trained on a large corpus of text to learn patterns and relationships between words, phrases, sentences, and/or other human language elements. The supervised training phase can be used for fine-tuning and can train the NLP system 252 using one or more labeled datasets to facilitate learning of specific natural language processing tasks, such as language translation, language generation, question answering, text classification, text summarization, etc. In certain embodiments, the NLP system 252 can be further trained by applying a fine-tuning procedure that enables the NLP system 252 to learn domains of desired asset categories (e.g., real estate assets, vehicle assets, aircraft assets, financial instrument assets, etc.). Many additional types of training procedures can be utilized to train the NLP system 252 described herein.

In certain embodiments, the neural network architecture 256 of the AI analysis engine 250 may further comprise a continuous learning mechanism 254 that improves the accuracy of the asset valuation analyses and recommendations provided by the asset evaluation system over time. As mentioned above, the data collection module 210 can be configured to continuously retrieve and access multi-modal asset data 215 from a wide range of sources, allowing the AI analysis engine and other components of the asset evaluation system 150 to update the value analyses performed on assets. Additionally, by continuously updating and analyzing transaction outcomes, the continuous learning mechanism 254 can refine the matching algorithms and analysis algorithms utilized by the asset evaluation system 150, improving the precision and accuracy of its recommendations over time.

In certain embodiments, the continuous learning mechanism 254 refines its understanding of which factors most strongly indicate value opportunities for different buyer profiles through continuous learning and analysis of transaction outcomes. When a matched buyer completes a transaction (e.g., purchases a real estate asset, vehicle asset, or other asset), the asset evaluation system 150 can track subsequent events, such as renovation projects, maintenance activities, and/or operational histories, to validate and improve its matching algorithms. This feedback loop helps ensure that the system's recommendations become increasingly accurate over time.

In certain embodiments, the continuous learning mechanism 254 may employ various machine learning techniques to adapt and improve its performance. In some examples, the continuous learning mechanism 254 may utilize reinforcement learning algorithms to optimize decision-making processes based on feedback from successful transactions and user interactions. The continuous learning mechanism 254 may also implement transfer learning methods to apply knowledge gained from one asset category to improve analysis in related categories. As new data becomes available, the continuous learning mechanism 254 may automatically retrain and fine-tune its models, incorporating the latest market trends, economic indicators, and user preferences. Additionally, in certain embodiments, the continuous learning mechanism 254 may also employ anomaly detection algorithms to identify and learn from unusual or outlier cases, enhancing its ability to recognize unique value propositions in assets. Additionally, the continuous learning mechanism 254 may leverage ensemble learning techniques, combining multiple models to produce more robust and accurate predictions. To ensure transparency and explainability, the continuous learning mechanism 254 may incorporate interpretable AI techniques that allow for the tracking and understanding of how the system's decision-making processes evolve over time. This ongoing refinement process may enable the asset evaluation system 150 to adapt to changing market conditions, emerging asset classes, and evolving user needs, maintaining its relevance and effectiveness in dynamic economic environments.

Figure 3:
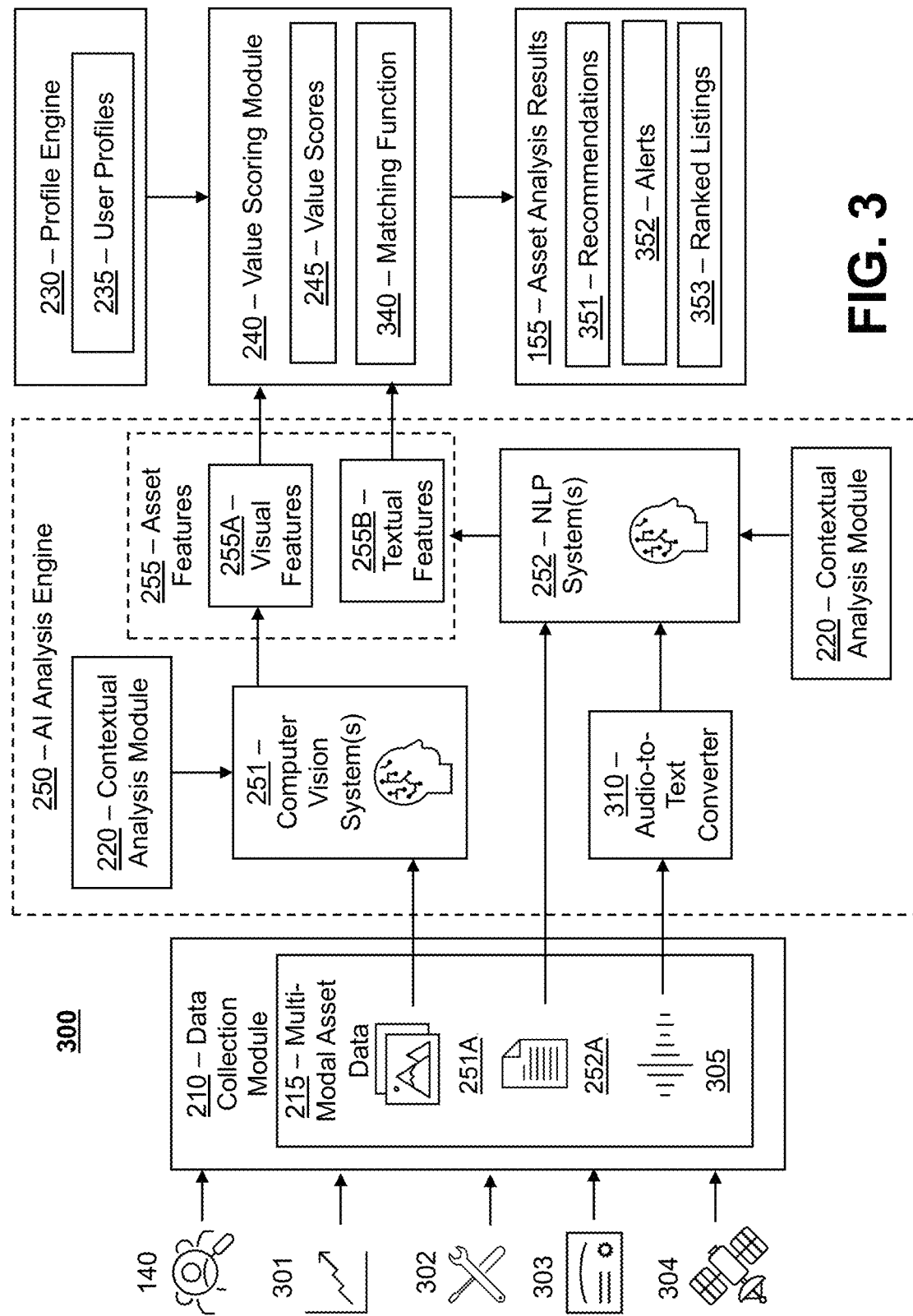
FIG. 3 is a flow diagram illustrating an exemplary technique for analyzing assets and personalizing asset analysis results in accordance with certain embodiments.

FIG. 3 is a flow diagram illustrating an exemplary process flow 300 for analyzing assets and personalizing asset analysis results in accordance with certain embodiments.

The process flow 300 begins with the collection of multi-modal asset data 215 for one or multiple types of assets 145 by the data collection module 210. In certain embodiments, this may include accessing or receiving multi-modal asset data 215 from one or more data feeds and/or one or more databases that provide listing data for one or more asset types (e.g., real estate assets, vehicle assets, aircraft assets, financial product assets, etc.). In some examples, real estate listing data may be received or collected from one or more IDXs (Internet Data Exchanges), one or more MLS (Multiple Listing Service) databases, and/or other types of data providers 170 that provide access to real estate listings. In other examples, vehicle and/or aircraft listing data may be received or collected from one or more DMSs (dealer management systems), listing aggregators, and/or other types of data providers 170 that provide access vehicle or aircraft listings. Various data feeds and/or databases may similarly be accessed to access the data for other types of assets 145 as well.

The multi-modal asset data 215 also can be collected in other ways. For example, this can include retrieving, scraping, and/or extracting digital asset listings 140 from one or more asset listing systems 180. For real estate assets, the asset listing systems 180 may include web platforms such as Zillow®, Trulia®, Redfin®, Compass®, MLS.com®, and/or other similar platforms that provide real estate listing or valuation services. For vehicle assets, the asset listing systems 180 may include web platforms such as AutoTrader®, Kelley Blue Book®, Carvana®, and/or other similar platforms that provide vehicle listing or valuation services. The data collection module 210 may similarly retrieve, scrape, and/or extract digital asset listings 140 from asset listing systems 180 that offer information or content pertaining to other types of physical or intangible assets, such as boats, equipment, items, digital art, financial products, securities, etc.

In addition to collecting digital asset listing data, the data collection module 210 also may retrieve, scrape, and/or extract multi-modal asset data 215 from one or more data providers 170 that provide additional or supplemental information associated with the assets 145. In some examples, the data providers 170 may provide access to market data 301, asset maintenance records 302, historical asset purchase records 303, and/or satellite imagery databases 304. Other examples of data that may be accessed by the data providers 170 are described below (and in other portions of this disclosure).

For real estate assets, the data providers 170 may include online platforms and/or databases that include additional image content 251A relevant to real estate assets (e.g., which include property images, aerial photography of properties, satellite imagery, and/or street-view images), as well as platforms and/or databases that provide property records, zoning and land use information, school information, crime statistics, environmental hazard information, flood zone maps, census databases, demographic information, economic information, transportation information, historical sales transactions, and/or other information that may relevant to assessing the value of real estate assets. For vehicle or aircraft assets, the data providers 170 may include online platforms and/or databases that include information such as vehicle history reports, DMV records, NHTSA information, safety ratings and recall information, manufacturer maintenance schedules and technical service bulletins, insurance claims, auction house transaction records, FAA aircraft registry information, aircraft maintenance logs, flight history information, aviation weather services, aircraft component pricing and availability information, user-reported issues and satisfaction ratings, and/or other information that may relevant to assessing the value of vehicle or aircraft assets. The data collection module 210 may similarly retrieve, scrape, and/or extract multi-modal asset data 215 from data providers 170 that offer information or content pertaining to other types of physical or intangible assets, such as boats, equipment, items, digital art, financial products, securities, etc.

The multi-modal asset data 215 obtained from the asset listing systems 180 and/or data providers 170 can include image content 251A (e.g., images, illustrations, animations, videos, etc.), textual content 252A, and/or audio content 305 (e.g., sound files, audio recordings, and/or audio content included in videos). The normalization component 212 of the data collection module 210 may normalize or standardize the multi-modal asset data 215 obtained from the various sources to facilitate processing and analysis. Additionally, as explained in other portions of this disclosure, a distributed processing architecture 213 of the data collection module 210 can be used to extract or obtain data from multiple sources in parallel and/or to allocate or execute analyses of the multi-modal asset data 215 in parallel.

The AI analysis engine 250 of the asset evaluation system 150 includes a neural network architecture 256 for processing and extracting various asset features 255 from multi-modal asset data 215 corresponding to the assets 145.

As explained above, the image content 251A included in the multi-modal asset data 215 may be processed by one or more computer vision systems 251 to extract various visual features 255A.

In some examples, for real estate assets, the computer vision system 251 may extract visual features 255A corresponding to construction quality, renovation potential, exterior conditions of the real estate assets, interior conditions of the real estate assets, neighborhood conditions, yard or property conditions, available exterior space for additions (e.g., for adding pools, guest houses, decks, and/or structures), architectural style, roof condition, presence of solar panels or other energy-efficient features, quality of landscaping, condition of driveways and walkways, presence and condition of fencing or gates, signs of water damage or structural issues, quality of windows and doors, presence of outdoor living spaces like patios or balconies, parking availability, proximity to neighboring structures, presence of mature trees or other valuable vegetation, and overall curb appeal. The system may also detect and assess the condition of nearby roads, sidewalks, and other public infrastructure that could impact property value.

In other examples, the computer vision system 251 may extract visual features 255A for vehicle assets, aircraft assets, financial instruction assets, equipment assets, product assets, and/or many other types of assets.

The textual content 252A included in the multi-modal asset data 215 may be processed by one or more NLP systems 252 to extract various textual features 255A. Amongst other things, the textual features 255B may include key data points or descriptions corresponding to the digital asset listings 140 and/or assets 145 themselves. The textual features 255B also may include insights or information derived from information extracted from data providers 170, which can provide a more wholistic understanding of the assets 145.

In some examples, for real estate assets, the one or more NLP systems 252 may extract textual features 255B corresponding to basic listing information relating to the real estate assets, such as the number of bedrooms, number of bathrooms, square footage, price, lot size, location, etc. The one or more NLP systems 252 also may analyze information obtained from one or more data providers 170 or asset listing systems 180 to obtain historical property records, asset-specific or neighborhood-based price trends, renovation histories, information on local schooling systems, zoning or regulatory information, etc.

In other examples, the one or more NLP systems 252 may extract textual features 255B for vehicle assets, aircraft assets, financial instruction assets, equipment assets, product assets, and/or many other types of assets.

The audio content 305 included in the multi-modal asset data 215 may initially be processed by one or more audio-to-text converters 310, which can convert audio data to textual content 252A. The textual content 252A can then be processed by one or more NLP systems 252 to extract various textual features 255A in the same manner described above.

During extraction of the asset features 255, including the visual features 255A and textual features 255B, the contextual analysis module 220 may communicate with, or leverage, the computer vision system 251 and/or NLP system 252 to glean additional asset features 255 that provide a more global understanding of the assets 145 and/or their value to specific end-users. In some examples, the contextual analysis module 220 can detect various environmental and/or situational factors that may affect the value of the asset 145, as well as more subtle factors that may be missed by human review.

In some examples, for real estate assets, the contextual analysis module 220 may leverage the NLP system 252 to analyze market trend data in the area of a particular real estate asset to identify whether or not the trends indicate a likely increase or decrease in value in the near future. In other examples, the contextual analysis module 220 may leverage the computer vision system 251 to analyze images of other nearby properties to detect renovations or gentrification, which can impact the value of a given real estate asset under review. In further examples, for vehicle or aircraft assets, the contextual analysis module 220 may leverage the NLP system 252 to understand pricing for fuel, commercial garages, and/or aircraft hangars in particular geographic regions to better understand overall costs associated with maintaining the vehicle or aircraft assets. The contextual analysis module 220 can analyze may other contextual, situational, or environmental factors for these and other assets.

As explained above, in addition to storing basic demographic information, the user profiles 235 stored for each end-user include various additional parameters that can impact the user's perception of value with respect to different types of assets. The personalization data or parameters stored in the user profiles 235 can be correlated with the asset features 255 derived for the assets 145 to generate custom value scores 245 for each end-user.

In certain embodiments, for each asset 145 under review, the value scoring module 240 can receive a first set of inputs comprising the asset features 255 that were identified or extracted by the AI analysis engine 250 and second set of inputs that includes the personalized data or preferences stored in a user profile 235 for a given end-user. The value scoring module 240 can execute a matching function 340 which considers both the asset features 255 and the personalization data for the end-user to compute a value score 245 indicating or predicting the value of the asset 145 to the end-user. For each asset 145, a separate value score 245 can be generated for each user profile 235 which considers the unique set of personalization preferences for a corresponding end-user. As such, the value scores 245 computed for a single asset 145 can vary significantly across different end-users based on how value is perceived by each end-user (as reflected by the unique parameters captured in the user profiles 235).

As mentioned in other portions of this disclosure, the value score 245 can account for value that is attributable to various factors that extend beyond the price and/or generic listing attributes associated with the asset 145, and may reflect value such as synergies with the end-user's existing assets, alignment with the end-user's technical capabilities or expertise, suitability for the end-user's intended use, potential for appreciation, potential for cost savings or revenue generation, tax advantages, lifestyle enhancement, long-term sustainability, and/or adaptability to future market trends. The value score may also incorporate factors like maintenance requirements, operational costs, and potential for customization or upgrades that align with the end-user's specific needs or preferences.

The techniques utilized by the matching function 340 to compute the values scores can vary. In some examples, the matching function 340 may employ a weighted scoring algorithm that assigns importance factors to different asset features and buyer profile characteristics, calculating a composite value score based on the degree of alignment between them. In other examples, the matching function 340 may utilize machine learning models, such as neural networks or decision trees, trained on historical data to predict value scores based on the relationships between asset features and buyer preferences. In other examples, the matching function 340 could use a similarity-based approach, computing distances between asset feature vectors and buyer profile vectors in a multi-dimensional space to determine how closely they match. Other techniques also may be utilized.

Various types of asset analysis results 155 may be presented to each end-user to identify assets 145 that most closely align with their interests, preferences, and/or capabilities. In some examples, one or more assets 145 may be presented as recommendations 351 to end-users. The recommendations 351 may be presented to the end-users when they access the asset evaluation system 150 and/or may be transmitted to the end-users via various communication channels. In other examples, after the asset evaluation system 150 has acquired sufficient data in a user profile 135 for an end-user, alerts 352 may be transmitted to the end-user via various communication channels when new assets 145 are discovered that are predicted to be of high value to the end-user and/or which exceed a certain value threshold.

In further examples, the value scores 245 can be utilized to enhance asset searching features accessible via the asset evaluation system 150. For example, in some embodiments, the asset evaluation system 150 may include a search engine that enables end-users to search a collection of digital asset listings for target assets 145, and a ranked listing 353 of search results may be presented to the end-user. The ranked listing 353 may order the search results, at least in part, using the value scores 245 to help end-users quickly identify assets 145 predicted to be of high value to the end-user.

Figure 4:
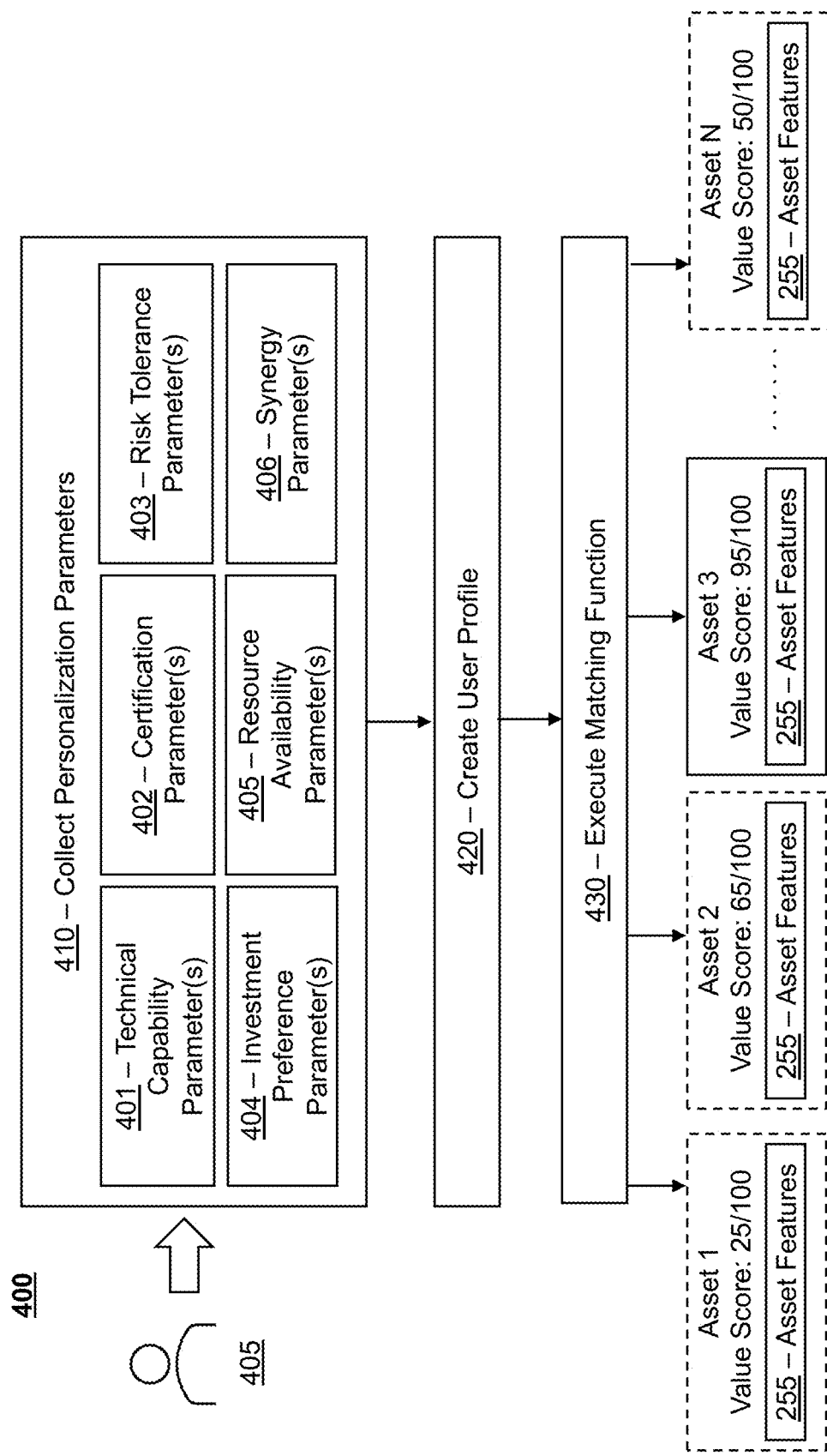
FIG. 4 is a flow diagram illustrating an exemplary profiling and matching technique in accordance with certain embodiments.

FIG. 4 is a process flow 400 illustrating an exemplary profiling and matching technique in accordance with certain embodiments.

In step 410, personalization parameters are collected from an end-user 405. A variety of unique personalization parameter types may be collected from the end-user including:

Technical capability parameters 401: In some examples, these parameters may indicate whether the end-user 405 possess skills, experience, or expertise with one or more of the following: construction or renovation; mechanical (e.g. automotive repair, aircraft maintenance, etc.); electrical engineering or electrician; plumbing; carpentry; HVAC system maintenance; software development; network administration; agricultural or farming; boat operation and maintenance; real estate development; financial analysis and investment management; legal knowledge related to specific asset types; architectural design; landscaping and grounds maintenance; property management.

Certification parameters 402: In some examples, these parameters may indicate whether the end-user 405 possesses certifications or licenses in one or more of the following: mechanic certifications (e.g. A&P license for aircraft, ASE certification for vehicles); vehicle licenses; specialized vehicle operation licenses (e.g. commercial driver's license); pilot licenses (e.g. private, commercial, instrument rating); real estate licenses (e.g. broker, agent); boating license; real estate broker licenses; legal certifications (e.g. bar admission, specialized legal certifications); financial certifications (e.g. CFA, CFP); construction-related certifications (e.g. general contractor license, electrician certification, plumber certification); information technology (IT) certifications (e.g. CISSP, AWS Certified Solutions Architect); property management certifications; appraisal certifications; home inspection certifications; farming or agricultural certifications; heavy equipment operation certifications.

Risk Tolerance Parameter(s) 403: In some examples, these parameters may indicate acceptable/unacceptable risk tolerances with respect to purchasing assets. The risk tolerance levels may vary across different types of assets.

Investment Preference Parameter(s) 404: In some examples, these parameters may indicate the reason or motivation behind purchasing particular assets. For example, with respect to real estate assets, these parameters may indicate if the end-user 405 is a family home purchaser, a non-married individual seeking a bachelor pad, a renovator seeking to purchase a fixer-upper property, a luxury home purchaser, an individual seeking to purchase a turnkey or move-in-ready home that does not require renovation or upgrade, etc. Similar types of investment preference profile information can be collected for other non-real estate assets as well.

Available Resource Parameter(s) 405: In some examples, these parameters may indicate the available money or resources that can be applied to purchasing an asset.

Synergy Parameter(s) 406: In some examples, these parameters may identify existing assets and/or existing businesses owned by the end-user 405, which potentially could be complimented by additional assets 145 offered via the asset evaluation system 150.

A wide variety of personalization parameters also can be collected for the end-user 405, including basic demographic information (e.g., (e.g., name, gender, location, annual income, race, age, job, etc.).

In step 420, the personalization parameters are stored in a user profile 235 for the end-user 405 and/or utilized to create a user profile 235 for the end-user 405.

In step 430, a matching function 340 is executed that utilizes the personalization parameters and/or user profile 235 associated with the end-user 405 to identify highly relevant assets 145.

In the example shown, a value score 245 is generated for each of a plurality of assets 145 (e.g., Asset 1, Asset 2, Asset 3, ... Asset N, where N can be any integer value). The value score 245 for each asset 145 is generated based, at least in part, on a comparison or correlation of the user profile 235 with the asset features 255 corresponding to each asset. Each asset that is determined or predicted to be of high value to the end-user can be flagged, and presented to the end-user 405 is connection with some form of asset analysis results 155 (e.g., in the form of recommendations 351, alerts 352, and/or ranked listings 353).

In the example illustrated in FIG. 4, most of the assets 145 that were reviewed were assigned a relatively low value score 245, which is indicated by assets with dashed lines. Therefore, the presentation of these assets to the end-user 405 would not be prioritized. However, one of the assets 145 (i.e., Asset 3) was discovered or predicted as representing high value to the end-user 405, which is shown in solid line. Therefore, this high-value asset may be prioritized in various forms of asset analysis results 155 and prominently featured in recommendations presented to the end-user 405.

The process flow 400 illustrated in FIG. 4 can be continuously executed as new assets 145 become available on the asset evaluation system 150. The process flow 400 also can be re-executed as new data is collected for existing assets 145, resulting in an updated set of asset features 255 for the existing assets 145 which can be compared against the user profile of the end-user.

Additionally, while the process flow 400 illustrated in FIG. 4 demonstrates the personalized asset discovery techniques as applied to a single end-user, it should be understood that the same process flow 400 can be executed for every end-user.

Figure 5:
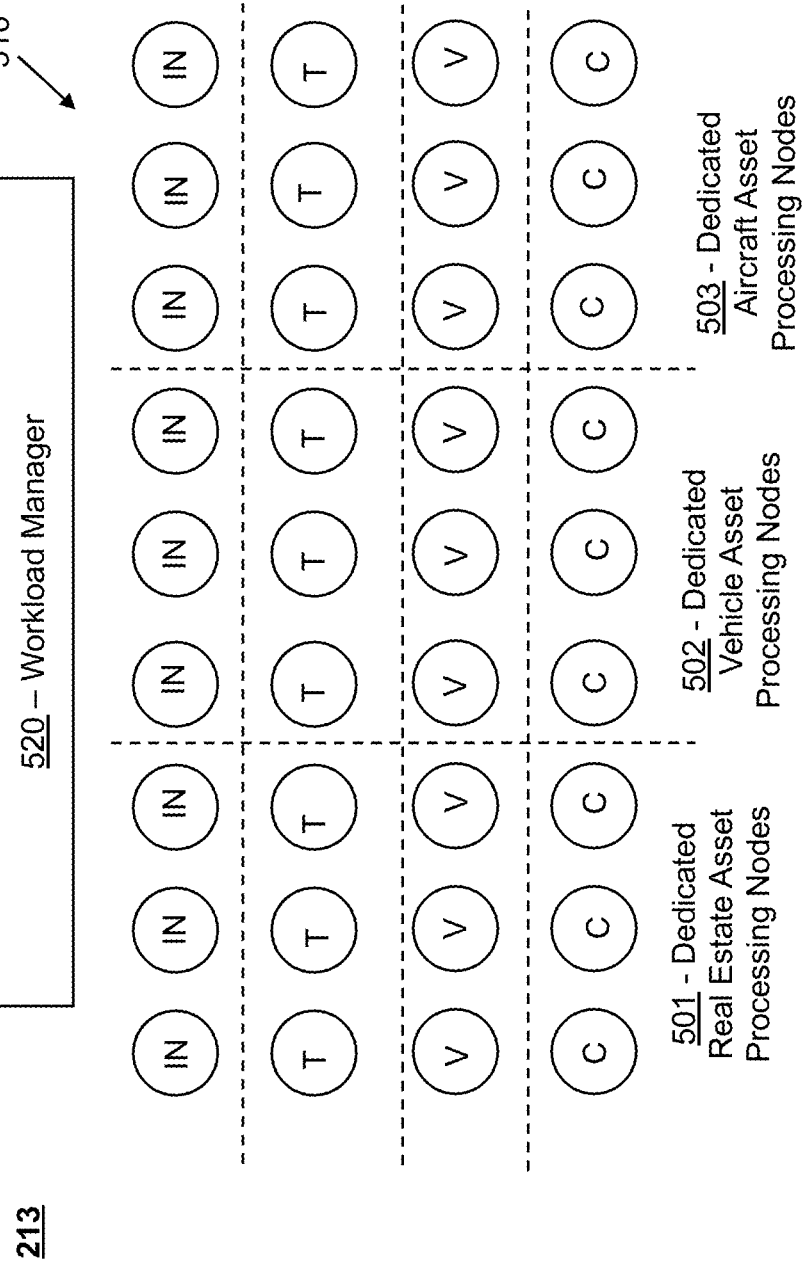
FIG. 5 is a diagram illustrate an exemplary distributed processing architecture according to certain embodiments.

FIG. 5 illustrates an exemplary configuration of a distributed processing architecture 213 according to certain embodiments. The example in FIG. 5 provides a simplified view of the distributed processing architecture 213. In practice, the distributed processing architecture 213 can have a vastly larger number of nodes and/or can accommodate greater numbers of asset classes.

The distributed processing architecture 213 includes a plurality of processing nodes 510. A first subset 501 of processing nodes 510 are dedicated to collecting and processing multi-modal data 215 pertaining to real estate assets. A second subset 502 of processing nodes 510 are dedicated to collecting and processing multi-modal data 215 pertaining to vehicle assets. A third subset 503 of processing nodes 510 are dedicated to collecting and processing multi-modal data 215 pertaining to aircraft assets. Additional nodes can be added to collect and process multi-modal data 215 for other asset classes.

In each of the processing node subsets (501, 502, 503), a plurality of processing nodes 510 (labeled "IN") are configured to gather or collect multi-modal data 215 from various data sources (e.g., data providers 170, asset listing systems 180, and/or other complimentary systems). In certain embodiments, these nodes can provide real-time, or near real-time, connections with multiple data sources and enable collection of data from the multi-modal data 215 sources in parallel.

Each of the processing node subsets (501, 502, 503) also include a plurality of processing nodes 510 (labeled "T") that are configured to perform analytics on textual content 252A that is included in the multi-modal data 215 collected from the data sources. In certain embodiments, each of these processing nodes 510 can utilize one or more NLP systems 252 to extract asset features 255 from the textual content 252A.

Each of the processing node subsets (501, 502, 503) also include a plurality of processing nodes 510 (labeled "V") that are configured to perform analytics on visual or image content 251A that is included in the multi-modal data 215 collected from the data sources. In certain embodiments, each of these processing nodes 510 can utilize one or more computer vision systems 251 to extract asset features 255 from the visual or image content 251A.

Each of the processing node subsets (501, 502, 503) also include a plurality of processing nodes 510 (labeled "C") that are configured to contextual asset features from multi-modal data 215 collected from the data sources.

In certain embodiments, each of these processing nodes 510 can utilize one or more computer vision systems 251, one or more NLP systems 252, or a combination thereof to extract asset features 255 from image content 251A and/or textual content 252A to derive contextual features relating to environmental factors, market conditions, regional trends, and/or situational elements that may impact the overall value or desirability of the assets under evaluation.

The distributed processing architecture 213 further includes a workload manager 520 that is configured to allocate analytical tasks among the processing nodes based on current workload and node capabilities, and monitor system performance and resource utilization across the nodes. The workload manager 520 can further execute load balancing functions and dynamically adjust task distribution to optimize processing efficiency. The workload manager 520 can further scale resources up or down by adding or removing processing nodes as needed (e.g., in adjusting to demand and/or to accommodate new categories of assets 145 that are added to the asset evaluation system 150).

FIG. 6 illustrates a flow chart for an exemplary method 200 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, system 100A, system 100B, and/or asset evaluation system 150 can be configured to perform method 600 and/or one or more of the steps of method 600. In these or other embodiments, one or more of the steps of method 600 can be implemented as one or more computer instructions configured to run at one or more processing devices 102 and configured to be stored at one or more non-transitory computer storage devices 101. Such non-transitory memory storage devices 101 can be part of a computer system such as system 100A, system 100B, and/or asset evaluation system 150.

In step 610, multi-modal asset data 215 corresponding to a plurality of assets 145 is collected by a data collection module.

In step 620, asset features 255 are extracted by an AI analysis engine 250 from the multi-modal asset data, at least in part, by analyzing image content and textual content included in the multi-modal asset data.

In step 630, a user profile 235 is created that stores personalization data corresponding to an end-user.

In step 640, value scores 245 are generated by a value scoring module 240 for each of the plurality of assets 145, at least in part, by correlating the asset features 255 extracted by the AI analysis engine 250 with the personalization data stored in the user profile 235.

In step 650, asset analysis results 160 are generated for the end-user based, at least in part, on the value scores 245 associated with the plurality of assets 145.

The discussion below demonstrates examples of how the asset evaluation system can apply an AI-driven asset analysis to personalize assets evaluations for different end-users.

Example 1: AI-Driven Asset Analysis and Personalized Value Assessment

Example 1 illustrates how the asset evaluation system 150 employs advanced AI technologies to evaluate an exemplary real estate property asset, tailoring its assessment to different user profiles 135. By leveraging multi-modal data analysis, environmental context evaluation, user profiling, and dynamic value scoring, the system provides personalized recommendations that align with each user's unique priorities and capabilities.

The asset 145 under evaluation in this example:

Property Address: 123 Example Street, Granite Bay, California

Listing Details:
Price: $599,000
Specifications: 3 bedrooms, 2 bathrooms, 1,350 square feet
Features: Premium sunroom, modern landscaping
Notable Context: Located directly across the street from a top-rated elementary school In this example, the data collection module 210 can initiate a thorough data aggregation process that includes:

1. Digital Asset Listing Data: Captures price, specifications, and basic features.
2. High-Resolution Imagery: Downloads and processes property photos.
3. Street View and Satellite Imagery: Retrieves images of the property and surrounding neighborhood.
4. Environmental Data: Gathers information on local schools, commute times, and neighborhood demographics.
5. Market Trends: Analyzes historical transaction records and regional appreciation rates.
6. Multi-Modal Data Integration: Normalizes and integrates data from diverse sources for analysis.

Additionally, the AI analysis engine 250 can employ specialized neural networks and AI algorithms to process the collected data:

1. Computer Vision Module:
   a. Image Recognition: Uses neural networks to detect construction quality, renovation potential, and maintenance patterns from property photos.
   b. Feature Extraction: Identifies premium features like the sunroom and modern landscaping.
2. Natural Language Processing (NLP):
   a. Textual Analysis: Extracts key attributes and implicit features from property descriptions.
3. Contextual Analysis Module:
   a. Environmental Analysis
      i. Neighborhood Analysis: Evaluates street-view and satellite images to assess neighborhood upkeep, safety indicators, and signs of community investment.
      ii. Proximity Evaluation: Calculates distances to amenities such as schools, parks, and shopping centers.
   b. Market Analysis Module:
      i. Comparative Market Analysis: Positions the property relative to comparable listings.
      ii. Appreciation Potential: Predicts future value trends based on historical data and current market dynamics.

The profile engine 230 customizes the analysis for four distinct user profiles:

1) The Hendersons (Family Buyers):
   a) Priorities: Proximity to high-quality schools, safety, family-friendly environment.
   b) Budget: $575,000-$650,000
   c) Capabilities: Moderate risk tolerance, plans for minor updates.
2) Dr. Chen (Luxury Buyer):
   a) Priorities: Move-in-ready property with modern amenities.
   b) Budget: $600,000-$800,000
   c) Capabilities: Low risk tolerance, no interest in renovations.
3) The Martinez Family (Value-Oriented Renovators):
   a) Priorities: Strong renovation potential, value addition.
   b) Budget: $500,000-$700,000
   c) Capabilities: Experienced contractors, high risk tolerance.
4) Horizon Properties LLC (Investment Buyer):
   a) Priorities: Rental income, appreciation potential, tenant appeal.
   b) Budget: Flexible based on projected returns.

The value scoring module 240 generates personalized values scores 245 for each user profile type (family purchaser, luxury purchaser, renovator purchaser, and investment purchaser) and the recommendations and alerts system 260 provides customized recommendations for each user profile.

1) Family Buyer Analysis (The Hendersons)
   a) Value Score: 94/100
   b) Key AI Insights:
      i) School Proximity: AI recognizes the property's direct location across a top-rated elementary school.
      ii) Safety Indicators: Image analysis shows well-maintained neighboring properties, low-traffic streets.

iii) Appreciation Potential: Market trends indicate strong future value growth.
c) Recommendation: "Highly recommended for families seeking a safe environment with excellent schools and strong appreciation potential."
2) Luxury Buyer Analysis (Dr. Chen)
a) Value Score: 78/100
b) Key AI Insights:
i) Condition Assessment: AI detects that kitchen and bathrooms may need updates to meet luxury standards.
ii) Comparative Analysis: Recommends alternative properties with desired amenities.
c) Recommendation: "Consider with potential renovations; may require additional investment to meet luxury expectations."
3) Renovator Analysis (The Martinez Family)
a) Value Score: 91/100
b) Key AI Insights:
i) Renovation Potential: Identifies areas for improvement that can significantly increase value.
ii) Cost Analysis: Estimates renovation costs and projected post-renovation market value.
c) Recommendation: "Excellent opportunity for value addition; strong ROI projected after renovations."
4) Investment Buyer Analysis (Horizon Properties LLC)
a) Value Score: 89/100
b) Key AI Insights:
i) Rental Demand: AI predicts high tenant appeal due to school proximity and neighborhood quality.
ii) Income Projections: Calculates favorable cap rates and rental income potential.
c) Recommendation: "Attractive investment with solid rental prospects and appreciation potential."

The following summarizes key actions taken by components of the asset evaluation system 150 in this example.
Data Collection Module: Aggregates multi-modal data for a holistic property view.
Analysis Engine: Utilizes AI for image recognition and textual analysis to extract detailed property insights.
Contextual Analysis Module: Evaluates environmental and market factors affecting value.
Buyer Profiling and Matching Engine: Tailors analysis based on unique buyer profiles.
Value Scoring Module: Generates dynamic, profile-specific value assessments.
Recommendation and Alert System: Delivers actionable insights aligned with user preferences.

In sum, by integrating advanced AI-driven analysis with personalized user profiling, the system uncovers high-value opportunities that align with individual user needs. Its ability to process vast data sources and adapt recommendations based on user capabilities represents a significant advancement over traditional asset evaluation methods.

Example 2: AI Detection of High-Risk Properties Through Comprehensive Analysis

This example demonstrates how the asset evaluation system 150 is capable of identifying high-risk real estate assets by analyzing both present features and notable absences using advanced AI techniques. In evaluating a property, the system uncovers significant concerns that may not be immediately apparent, providing tailored risk assessments for different user profiles.

The asset 145 under review in this example:
Property Address: 555 Example Lane in Landers, California
Listing Details:
  Price: $145,000
  Lot Size: 5 acres
  Features: Recently upgraded exterior with new stucco
  Year Built: 1956
  Square Footage: 192
The data collection module 210 can initiate a data aggregation process that includes:
1. Listing Data: Captures basic specifications and seller-provided details.
2. High-Resolution Imagery: Processes available photos for AI analysis.
3. Environmental Data: Gathers information on location, infrastructure, and accessibility.
4. Market Trends: Analyzes local property values and development patterns.
5. Multi-Modal Integration: Integrates data for comprehensive analysis.

The AI analysis engine 250 leverages AI models to detect risks:
Expected Feature Analysis:
  Missing Elements Detection: AI identifies the absence of standard features like kitchen, bathroom, and interior living spaces.
  Statistical Comparison: Flags deviations from typical listings (e.g. >98% of listings include bathroom photos).
Visual Analysis Module:
  Structural Assessment: Evaluates building materials, insulation, and structural integrity from images.
  Infrastructure Detection: Searches for utility connections and essential systems.
Environmental Context Module:
  Location Analysis: Assesses remoteness, access roads, and proximity to amenities.
  Development Indicators: Evaluates the level of surrounding development and market demand.

The AI analysis engine 250 findings and risk assessments:
1. Critical Absence of Features:
  No Kitchen or Bathroom: Suggests uninhabitable conditions.
  Lack of Interior Finishes: No flooring, insulation, or livable spaces detected.
  Missing Utilities: Absence of electrical, HVAC, and sewage connections.
2. Structural Concerns:
  Basic Construction: Concrete block structure with no insulation detected.
  Security Issues: Boarded windows indicate potential damage or vandalism.
  Inadequate Roofing: Minimal overhangs raise weatherproofing concerns.
3. Infrastructure Limitations:
  Utility Connections: Only a preliminary water hookup is present.
  Unpermitted Work: Exposed conduits suggest possible code violations.
4. Environmental Challenges:
  Remote Location: Situated in a desert area with limited accessibility.
  Lack of Development: Few nearby structures or community services.

The value scoring module 240 generates personalized values scores 245 for different user profile types (traditional home buyer, professional developer, investment purchaser, and DIY homesteader) and the recommendations and alerts system 260 provides customized recommendations for each user profile.

1. Traditional Homebuyer
   Value Score: 15/100
   AI Insights:
      High Costs: Estimated $150,000-$200,000 to make it habitable.
      Quality of Life: Remote location unsuitable for daily living.
      Recommendation: "Strongly not recommended; risks and costs far exceed benefits."
2. Professional Developer
   Value Score: 35/100
   AI Insights:
      Financial Feasibility: Development costs unlikely to be recouped due to low market demand.
      Infrastructure Challenges: Significant investment needed for utilities and permits.
      Recommendation: "Not advisable; project likely financially unfeasible."
3. Investment Buyer
   Value Score: 20/100
   AI Insights:
      Poor Liquidity: Difficult resale potential in a limited market.
      High Risk: Uncertain returns with significant upfront costs.
      Recommendation: "Strong pass; high risk with minimal upside."
4. DIY Homesteader
   Value Score: 45/100
   AI Insights:
      Self-Sufficiency Potential: Property may suit those seeking off-grid living.
      Significant Effort Required: Extensive work needed to establish livable conditions.
      Recommendation: "Possible with caution; suitable only for experienced individuals prepared for remote living."

The following summarizes key actions taken by components of the asset evaluation system 150 in this example.

Data Collection Module: Aggregates and normalizes diverse data sources.

Analysis Engine: Uses AI to detect missing features and structural issues.

Contextual Analysis Module: Assesses environmental and market factors.

Buyer Profiling and Matching Engine: Customizes risk assessments.

Value Scoring Module: Generates scores reflecting true risks.

Recommendation and Alert System: Provides clear, cautionary advice.

In sum, by leveraging AI-driven analysis, the system uncovers hidden risks that may be overlooked in traditional evaluations. It identifies critical missing features, estimates true costs, and assesses environmental challenges, enabling buyers to make informed decisions. This example underscores the system's capability to protect users from misleading listings by providing objective, comprehensive assessments aligned with their profiles.

Example 3: AI-Powered Aircraft Evaluation Tailored to Buyer Profiles

This example demonstrates how the system evaluates a high-value aircraft—a 2003 Cirrus SR20—using AI-driven analysis to provide tailored assessments for different buyer profiles. By analyzing multi-modal data, maintenance history, and buyer-specific factors, the system generates personalized value scores and recommendations.

The asset 145 under evaluation:
   Aircraft: 2003 Cirrus SR20
   Registration: N555CD
   Specifications:
      Total Time Airframe (TTAF): 3,810 hours
      Engine Time Since Overhaul (TSO): 2,300 hours (over recommended TBO)
   Avionics:
      Dual Avidyne IFD440 NAV/COMM units
      Aspen PFD 1000 Evolution glass cockpit
      Garmin G1275 backup attitude indicator
      STEC 55X Autopilot
   Additional Features:
      Recent parachute repack
      Complete logbooks
   Condition:
      Paint and interior rated at 7/10
      Well-maintained with strong service history
   Location: Hangar in Pflugerville, Texas (KEDC)

The data collection module 210 can initiate a data aggregation process that includes:
1. Listing Information: Collects detailed specifications and features.
2. High-Resolution Imagery: Processes photos of the aircraft's exterior, interior, and avionics.
3. Maintenance Records: Aggregates logbooks and service history.
4. Market Data: Analyzes comparable aircraft prices and demand trends.
5. Multi-Modal Integration: Normalizes data for AI analysis.

The AI analysis engine 250 can employ specialized neural networks and AI algorithms to process the collected data:
   Visual Analysis Module:
      Image Recognition: Identifies avionics upgrades and assesses wear patterns.
      Condition Assessment: Evaluates paint quality and interior wear.
   Maintenance Analysis:
      Engine Evaluation: Flags the engine's TSO exceeding TBO, indicating potential overhaul needs.
      Service History Review: Uses NLP to analyze maintenance logs for consistency and quality.
   Market Analysis Module:
      Valuation Metrics: Positions the aircraft relative to market standards.
      Demand Indicators: Assesses desirability based on features and condition.

The value scoring module 240 generates personalized values scores 245 for different user profile types (new pilot, pilot with A&P mechanic certification, and flight school owner) and the recommendations and alerts system 260 provides customized recommendations for each user profile.

1. New Pilot
   Value Score: 65/100
   AI Insights:
      Avionics Advantage: Modern avionics enhance safety and ease of use.
      Engine Risk: Over-TBO engine may lead to unexpected costs and is flagged as a significant risk.
      Maintenance Positives: Recent parachute repack and complete logs add confidence.

Recommendation: "Possible with caution; consider potential engine overhaul costs in the purchase decision."
2. Pilot with A&P (Airframe & Powerplant) Mechanic Certification
Value Score: 85/100
AI Insights:
Engine Opportunity: Mechanical expertise mitigates overhaul costs, turning a drawback into a value point.
Avionics Value: Advanced systems provide long-term benefits without additional investment.
Well-Maintained Condition: Reduces likelihood of unforeseen issues.
Recommendation: "Highly recommended; excellent value for mechanically skilled buyers."
3. Flight School Owner
Value Score: 55/100
AI Insights:
Training Suitability: Advanced avionics are beneficial for student training.
Operational Risk: Over-TBO engine increases the risk of downtime, impacting scheduling.
Maintenance Considerations: Potential for higher ongoing maintenance costs.
Recommendation: "Not recommended; engine status may disrupt training operations."

The following summarizes key actions taken by components of the asset evaluation system 150 in this example.
Data Collection Module: Aggregates multi-modal data, including imagery and maintenance records.
Analysis Engine: Uses AI for detailed condition assessment and maintenance evaluation.
Contextual Analysis Module: Evaluates market trends and demand for similar aircraft.
Buyer Profiling and Matching Engine: Tailors analysis to buyer capabilities and needs.
Value Scoring Module: Generates dynamic, profile-specific value assessments.
Recommendation and Alert System: Provides actionable insights and cautions based on analysis.

In sum, the AI-driven analysis of the asset evaluation system 150 provides nuanced evaluations tailored to different buyer profiles, highlighting both opportunities and risks. By considering the aircraft's features, condition, maintenance history, and aligning them with buyer capabilities, the system empowers users to make informed decisions. This personalized approach enhances the asset evaluation process beyond traditional methods.

These above examples illustrate exemplary capabilities of the asset evaluation system 150 according to certain embodiments, but are not exhaustive of its potential applications. The asset evaluation system 150 can be adapted or designed with a versatile architecture and advanced AI-driven methodologies that can be extended to a multitude of asset types beyond those discussed. For instance, in the automotive industry, the system can evaluate vehicles by analyzing factors like mechanical condition, maintenance history, market demand, and buyer preferences to provide personalized value assessments. When applied to vacation properties, it can assess rental income potential, seasonal trends, local attractions, and property management considerations to identify high-value investment opportunities. Furthermore, in the realm of business acquisitions, the system can analyze financial performance, market positioning, and potential synergies with a buyer's existing operations-especially beneficial for strategic buyers looking to enhance their portfolios through complementary assets. By accommodating various asset classes and tailoring its analysis to the unique factors relevant to each, the asset evaluation system 150 offers a comprehensive tool for intelligent asset evaluation across diverse markets and industries.

In certain embodiments, an asset evaluation system includes one or more processing devices and one or more non-transitory storage devices for storing instructions. When executed by the processing devices, these instructions cause the system to perform functions including collecting multi-modal asset data corresponding to multiple assets using a data collection module, extracting asset features from the multi-modal asset data using an artificial intelligence (AI) analysis engine by analyzing image and textual content, creating a user profile that stores personalization data for an end-user, generating value scores for each asset using a value scoring module by correlating the extracted asset features with the personalization data, and generating asset analysis results for the end-user based on the value scores.

In certain embodiments, the AI analysis engine of the asset evaluation system comprises a neural network architecture that includes or communicates with at least one computer vision system and at least one natural language processing system. The computer vision system extracts a first subset of asset features from the image content in the multi-modal asset data, while the natural language processing system extracts a second subset of asset features from the textual content. These subsets of asset features are then correlated with the personalization data to generate the value scores for the assets.

In certain embodiments, the data collection module of the asset evaluation system continuously monitors and aggregates the multi-modal data from multiple separate sources to facilitate real-time or near real-time market awareness for the assets.

In certain embodiments, the asset evaluation system includes a distributed processing architecture that executes analytical tasks in parallel to extract the asset features from the multi-modal asset data.

In certain embodiments, the personalization data stored in the user profile for the end-user includes at least one of a technical capability parameter indicating the end-user's proficiency, experience, or expertise in one or more technical fields, a certification parameter indicating one or more certifications associated with the end-user, an investment preference parameter indicating the end-user's motivation for asset acquisition, or a synergy parameter indicating existing assets or businesses owned by the end-user that may be complemented by assets offered through the asset evaluation system. The value scores are generated based, at least in part, on one or more of these parameters.

In certain embodiments, the personalization data stored in the user profile for the end-user further includes at least one of a risk tolerance parameter indicating acceptable levels of risk for asset acquisition across one or more asset types, or a resource availability parameter indicating resources available to the end-user for acquiring or maintaining new assets. The value scores are generated based, at least in part, on one or more of these additional parameters.

In certain embodiments, a subset of the asset features extracted from the multi-modal asset data includes contextual asset features comprising environmental factors, market dynamics, regional trends, neighborhood conditions, economic indicators, development patterns, usage conditions, or situational elements that may impact the overall value or desirability of the assets to the end-user. The value scores are generated based, at least in part, on these contextual asset features.

In certain embodiments, the multi-modal asset data corresponding to multiple assets is collected from one or more asset listing systems and one or more data providers.

In certain embodiments, the multi-modal asset data collected from the data providers includes at least one of market data, asset maintenance records, historical asset purchase records, or satellite imagery data.

In certain embodiments, the asset analysis results generated by the asset evaluation system comprise at least one of a listing of assets ranked or ordered according to the value scores, one or more personalized asset recommendations tailored to the end-user's profile, one or more alerts notifying the end-user of high-value asset opportunities, or one or more detailed asset valuation reports including multi-dimensional value assessments.

In certain embodiments, a method for asset evaluation is implemented via execution of computing instructions by one or more processing devices and stored on one or more non-transitory storage devices. The method includes collecting multi-modal asset data corresponding to multiple assets, extracting asset features from the multi-modal asset data using an AI analysis engine by analyzing image and textual content, creating a user profile that stores personalization data for an end-user, generating value scores for each asset by correlating the extracted asset features with the personalization data, and generating asset analysis results for the end-user based on the value scores.

In certain embodiments, the method of extracting asset features includes using at least one computer vision system to extract a first subset of asset features from the image content and at least one natural language processing system to extract a second subset of asset features from the textual content in the multi-modal asset data. These subsets of asset features are then correlated with the personalization data to generate the value scores for the assets.

In certain embodiments, the method further includes continuously monitoring and aggregating the multi-modal data from multiple separate sources to facilitate real-time or near real-time market awareness for the assets.

In certain embodiments, the method of extracting asset features from the multi-modal asset data includes executing analytical tasks in parallel using a distributed processing architecture.

In certain embodiments, the method involves storing personalization data in the user profile for the end-user, including at least one of a technical capability parameter, a certification parameter, an investment preference parameter, or a synergy parameter. The value scores are generated based, at least in part, on one or more of these parameters.

In certain embodiments, the method involves storing additional personalization data in the user profile for the end-user, including at least one of a risk tolerance parameter or a resource availability parameter. The value scores are generated based, at least in part, on one or more of these additional parameters.

In certain embodiments, the method involves extracting a subset of asset features from the multi-modal asset data that includes contextual asset features comprising environmental factors, market dynamics, regional trends, neighborhood conditions, economic indicators, development patterns, usage conditions, or situational elements that may impact the overall value or desirability of the assets to the end-user. The value scores are generated based, at least in part, on these contextual asset features.

In certain embodiments, the method of collecting multi-modal asset data corresponding to multiple assets involves collecting the data from one or more asset listing systems and one or more data providers.

In certain embodiments, the method involves collecting multi-modal asset data from the data providers that includes at least one of market data, asset maintenance records, historical asset purchase records, or satellite imagery data.

In certain embodiments, the method of generating asset analysis results involves generating at least one of a listing of assets ranked or ordered according to the value scores, one or more personalized asset recommendations tailored to the end-user's profile, one or more alerts notifying the end-user of high-value asset opportunities, or one or more detailed asset valuation reports including multi-dimensional value assessments.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A vehicle asset evaluation system comprising:
one or more processing devices; and
one or more non-transitory storage devices for storing instructions, wherein execution of the instructions by the one or more processing devices causes the one or more processing devices to execute functions comprising:
receiving multi-modal asset data corresponding to a plurality of vehicle assets, the multi-modal asset data at least including image content and textual content corresponding to the plurality of vehicle assets;
extracting, by an artificial intelligence (AI) analysis engine, vehicle features from the multi-modal asset data, at least in part, by:
executing one or more computer vision functions to extract visual features from the image content included in the multi-modal asset data; and
executing one or more natural language processing (NLP) functions to extract textual features from the textual content included in the multi-modal asset data;
wherein the vehicle features comprise both the visual features extracted by the one or more computer vision functions and the textual features extracted by the one or more NLP functions;
creating a profile that stores personalization data;
generating value scores for the plurality of vehicle assets, at least in part, by correlating the vehicle features extracted by the AI analysis engine with the personalization data stored in the profile; and
generating vehicle analysis results based, at least in part, on the value scores associated with the plurality of vehicle assets.

2. The system of claim 1, wherein the plurality of vehicle assets includes used vehicle assets, and the vehicle features extracted by the AI analysis engine correspond to vehicle condition indicators associated with the used vehicle assets.

3. The system of claim 2, wherein the vehicle condition indicators associated with the used vehicle assets comprise one or more of: a paint quality indicator; a vehicle wear indicator; a vehicle damage indicator; or an interior vehicle condition indicator.

4. The system of claim 1, wherein the vehicle analysis results are generated based, at least in part, on an end-user's existing collection of vehicles.

5. The system of claim 1, wherein the value scores for the plurality of vehicle assets are generated based, at least in part, on a synergy between the plurality of vehicle assets and an end-user's collection of vehicles.

6. The system of claim 1, wherein the personalization data indicates a preference for luxury vehicle assets and the vehicle analysis results are generated, at least in part, on the preference for luxury vehicle assets.

7. The system of claim 1, wherein the vehicle features extracted by the AI analysis engine include vehicle features corresponding to custom modifications made to the plurality of vehicle assets.

8. The system of claim 1, wherein:
the textual features extracted using the one or more NLP functions include textual features that are derived from maintenance history records or service records; and
the value scores reflect an impact of maintenance on vehicle asset value.

9. The system of claim 1, wherein:
the vehicle features include contextual features derived from a regional market demand or auction transaction data; and
the value scores are generated based, at least in part, on the contextual features.

10. The system of claim 1, wherein at least a portion of the vehicle analysis results include vehicle assets predicted to be undervalued based, at least in part, on a consideration of vehicle condition and alignment with the personalization data.

11. The system of claim 1, wherein at least a portion of the vehicle analysis results include vehicle assets predicted to be of greater value than their listed price due to alignment with the personalization data.

12. The system of claim 1, wherein the value scores predict user-specific values for the plurality of vehicle assets based on the personalized data, and the vehicle asset results include a subset of vehicle assets determined to have the highest user-specific values.

13. The system of claim 1, wherein the multi-modal asset data corresponding to the plurality of vehicle assets is received by the vehicle asset evaluation system in real-time or near real-time.

14. The system of claim 1, wherein the vehicle asset evaluation system maintains a connection with one or more vehicle data providers that enables updates to the multi-modal asset data to be received in real-time or near real-time.

15. The system of claim 1, wherein the plurality of vehicle assets corresponds to at least one of: automotive vehicle assets; aircraft vehicle assets; or water vehicle assets.

16. The system of claim 1, wherein extracting the vehicle asset features from the multi-modal asset data includes detecting one or more missing elements associated with at least one vehicle asset or detecting an absence of one or more vehicle asset features expected to be included in the multi-modal data corresponding to the at least one vehicle asset.

17. The system of claim 16, wherein a value score generated for the at least one vehicle asset is adjusted to account for the one or more missing elements or the absence of the one or more vehicle asset features expected to be included in the multi-modal data.

18. The system of claim 1, wherein the multi-modal asset data comprises static images, video data, text, and/or audio data corresponding to the plurality of vehicle assets.

19. A method implemented via execution of computing instructions executed by one or more processing devices and stored on one or more non-transitory storage devices, the method comprising:

receiving multi-modal asset data corresponding to a plurality of vehicle assets, the multi-modal asset data at least including image content and textual content corresponding to the plurality of vehicle assets;

extracting, by an artificial intelligence (AI) analysis engine, vehicle features from the multi-modal asset data, at least in part, by:

executing one or more computer vision functions to extract visual features from the image content included in the multi-modal asset data; and executing one or more natural language processing (NLP) functions to extract textual features from the textual content included in the multi-modal asset data;

wherein the vehicle features comprise both the visual features extracted by the one or more computer vision functions and the textual features extracted by the one or more NLP functions;

creating a profile that stores personalization data;

generating value scores for the plurality of vehicle assets, at least in part, by correlating the vehicle features extracted by the AI analysis engine with the personalization data stored in the profile; and generating vehicle analysis results based, at least in part, on the value scores associated with the plurality of vehicle assets.

20. The method of claim 19, wherein extracting the vehicle asset features from the multi-modal asset data includes detecting one or more missing elements associated with at least one vehicle asset or detecting an absence of one or more vehicle asset features expected to be included in the multi-modal data corresponding to the at least one vehicle asset.

\* \* \* \* \*